United States Patent [19]
Saito et al.

[11] Patent Number: 6,161,183
[45] Date of Patent: Dec. 12, 2000

[54] DATA VERIFYING METHOD APPARATUS FOR CREATING DATA TO BE VERIFIED AND DATA VERIFYING APPARATUS

[75] Inventors: Kazuo Saito; Kilho Shin; Koji Takeda, all of Ashigarakami-gun, Japan

[73] Assignee: Fuji Xerox Co., Ltd., Tokyo, Japan

[21] Appl. No.: 08/950,184

[22] Filed: Oct. 14, 1997

[30] Foreign Application Priority Data

Oct. 21, 1996 [JP] Japan ..................................... 8-278423

[51] Int. Cl.[7] ..................................................... H04L 9/00
[52] U.S. Cl. ........................... 713/176; 713/179; 713/185; 713/200; 713/193; 380/282; 380/283; 705/67; 705/77
[58] Field of Search .................................. 705/52, 54, 55, 705/56, 57, 59, 65, 67, 77; 713/159, 176, 179, 185, 193; 380/231, 233, 49, 30, 282, 283, 284, 285

[56] References Cited

U.S. PATENT DOCUMENTS

| | | | |
|---|---|---|---|
| 4,796,181 | 1/1989 | Wiedemer | 364/406 |
| 5,048,085 | 9/1991 | Abraham et al. | 380/23 |
| 5,155,680 | 10/1992 | Wiedemer et al. | 364/406 |
| 5,347,579 | 9/1994 | Blandford | 380/25 |
| 5,737,415 | 4/1998 | Akiyama et al. | 380/4 |
| 5,748,740 | 5/1998 | Curry et al. | 380/25 |
| 5,757,915 | 5/1998 | Aucsmith et al. | 380/25 |

FOREIGN PATENT DOCUMENTS

| | | |
|---|---|---|
| 63-124155 | 5/1988 | Japan . |
| 3-25605 | 2/1991 | Japan . |
| 3-100753 | 4/1991 | Japan . |
| 6-180762 | 6/1994 | Japan . |
| B2-6-95302 | 11/1994 | Japan . |
| 7-21276 | 1/1995 | Japan . |

OTHER PUBLICATIONS

"Data Encryption Standard (DES)", Chapter 12, pp. 265–271.
Bruce Schneier; Applied Cryptography, Second Edition: Protocols, Algorithms, and Source Code in C; pp. 193–195.
Chapter 18: One–Way Hash Functions, pp. 455–457.
JIS–X5052 "Modes of operation for a 64–bit block cipher algorithm," pp. 91–95.

*Primary Examiner*—Tod R. Swann
*Assistant Examiner*—Paul E. Callahan
*Attorney, Agent, or Firm*—Oliff & Berridge, PLC

[57] ABSTRACT

A token 12 creates utilization history information and sends the information to an information processing unit 11 and simultaneously creates an verification value and stores the value in a utilization-value holding unit 21. The information processing unit 11 records the utilization history information in a history holding unit 16. On receiving a verification-value output request from the information processing unit 11, the token 12 provides the verification value with a signature and outputs the combination of the verification value and the signature. The information processing unit sends to a recovery unit 13 the verification value with the signature as well as the utilization history information. The recovery unit 13 verifies the signature and also the utilization history on the basis of the verification value further.

21 Claims, 19 Drawing Sheets

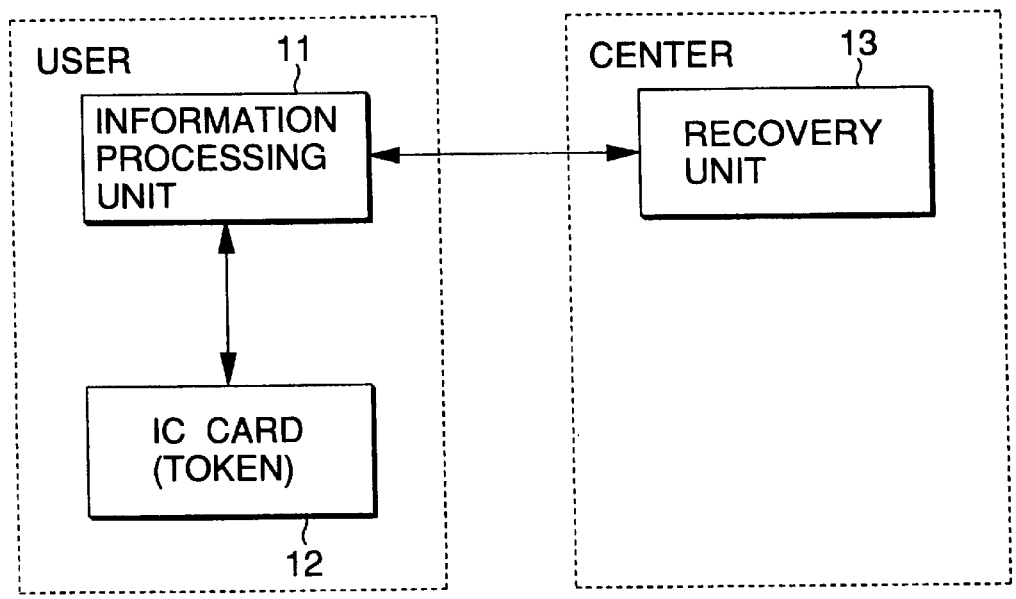
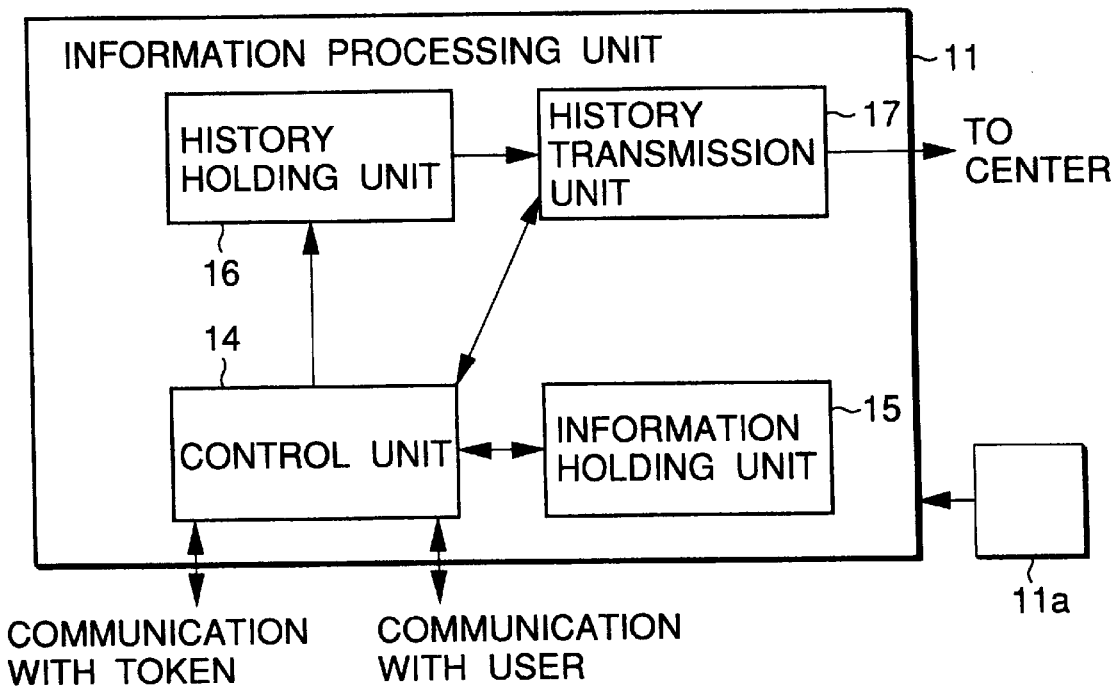

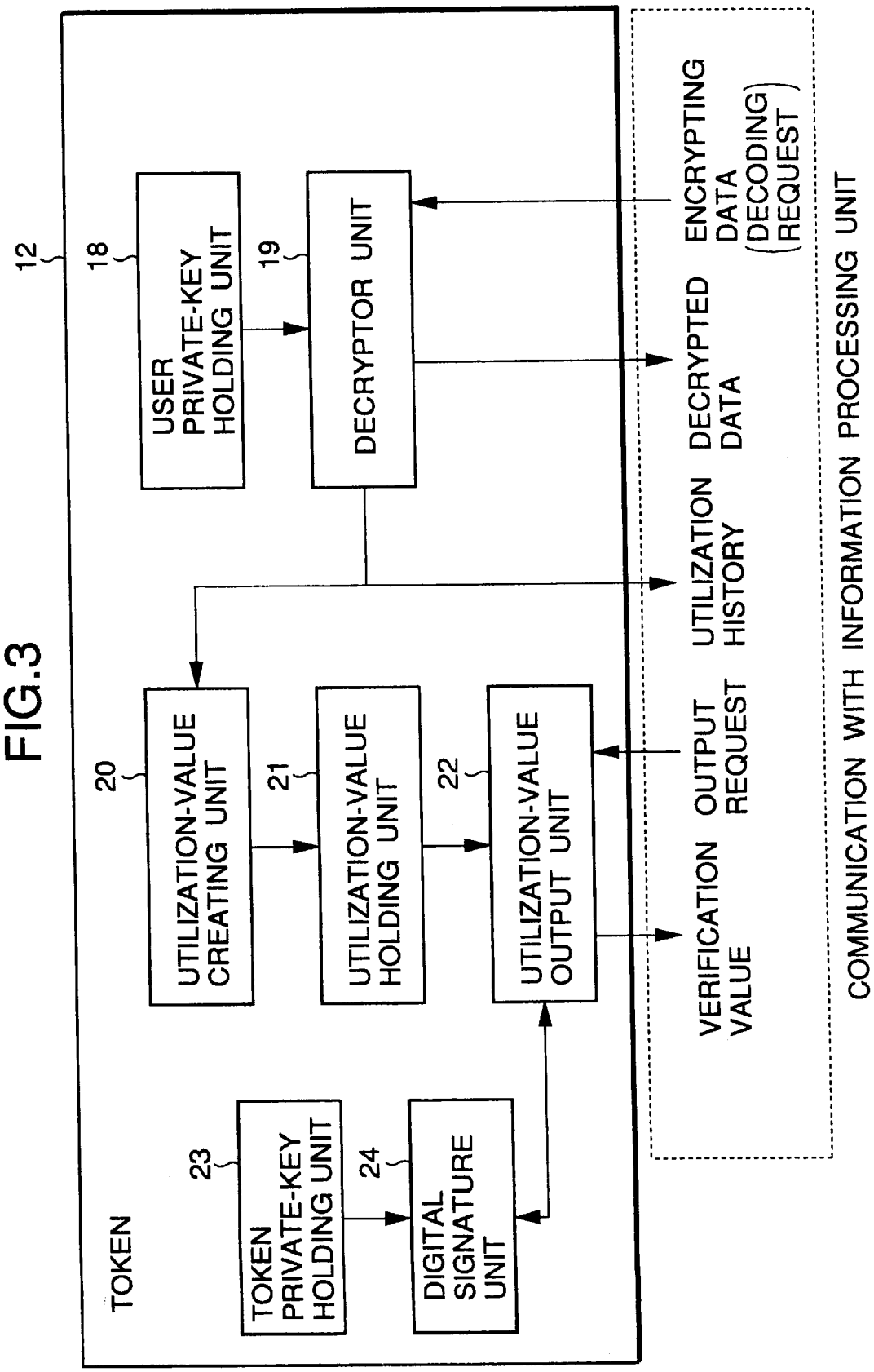

CONTENTS OF VERIFICATION-VALUE HOLDING UNIT

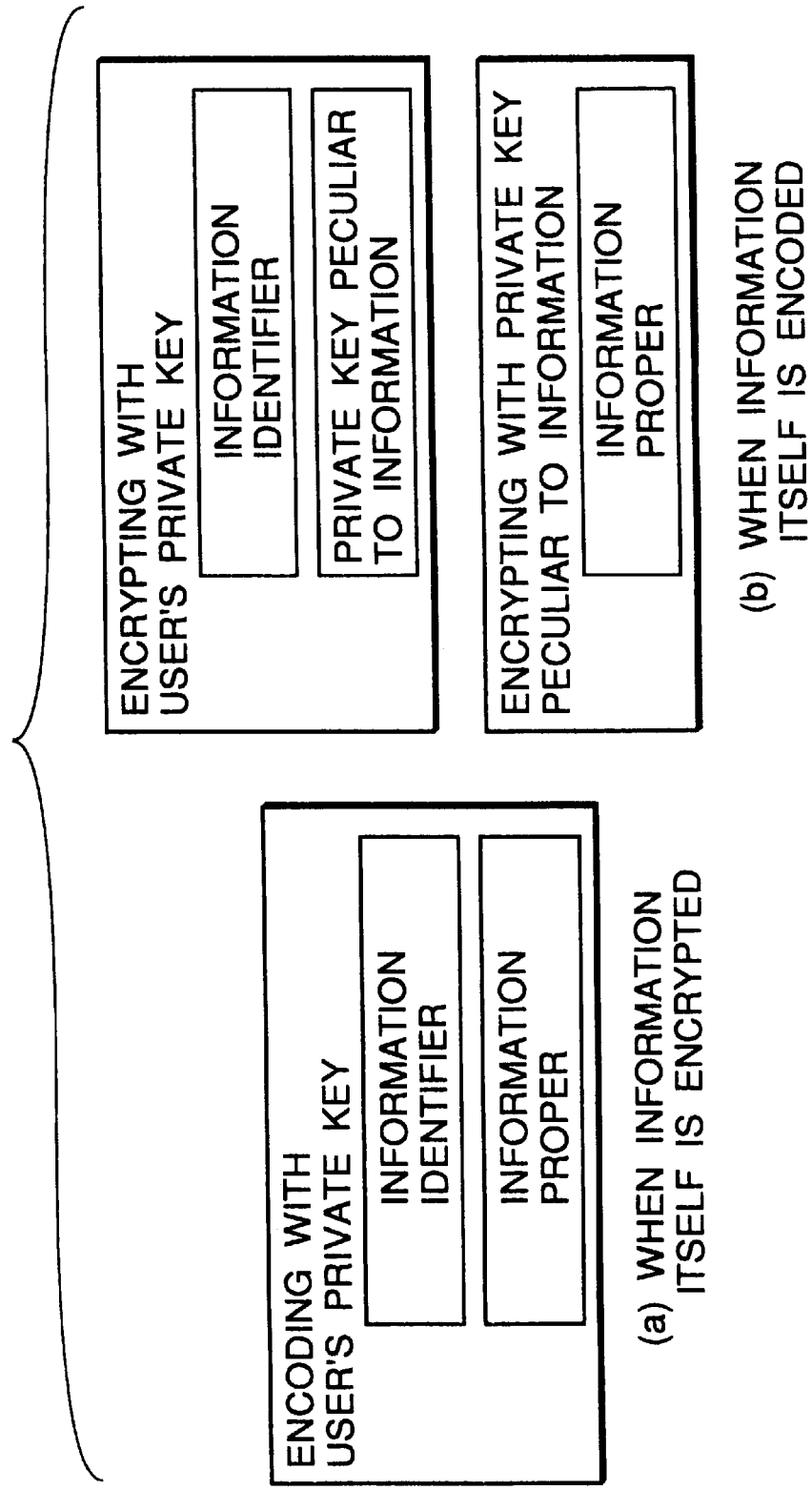

CONSTRUCTION OF UTILIZATION HISTORY

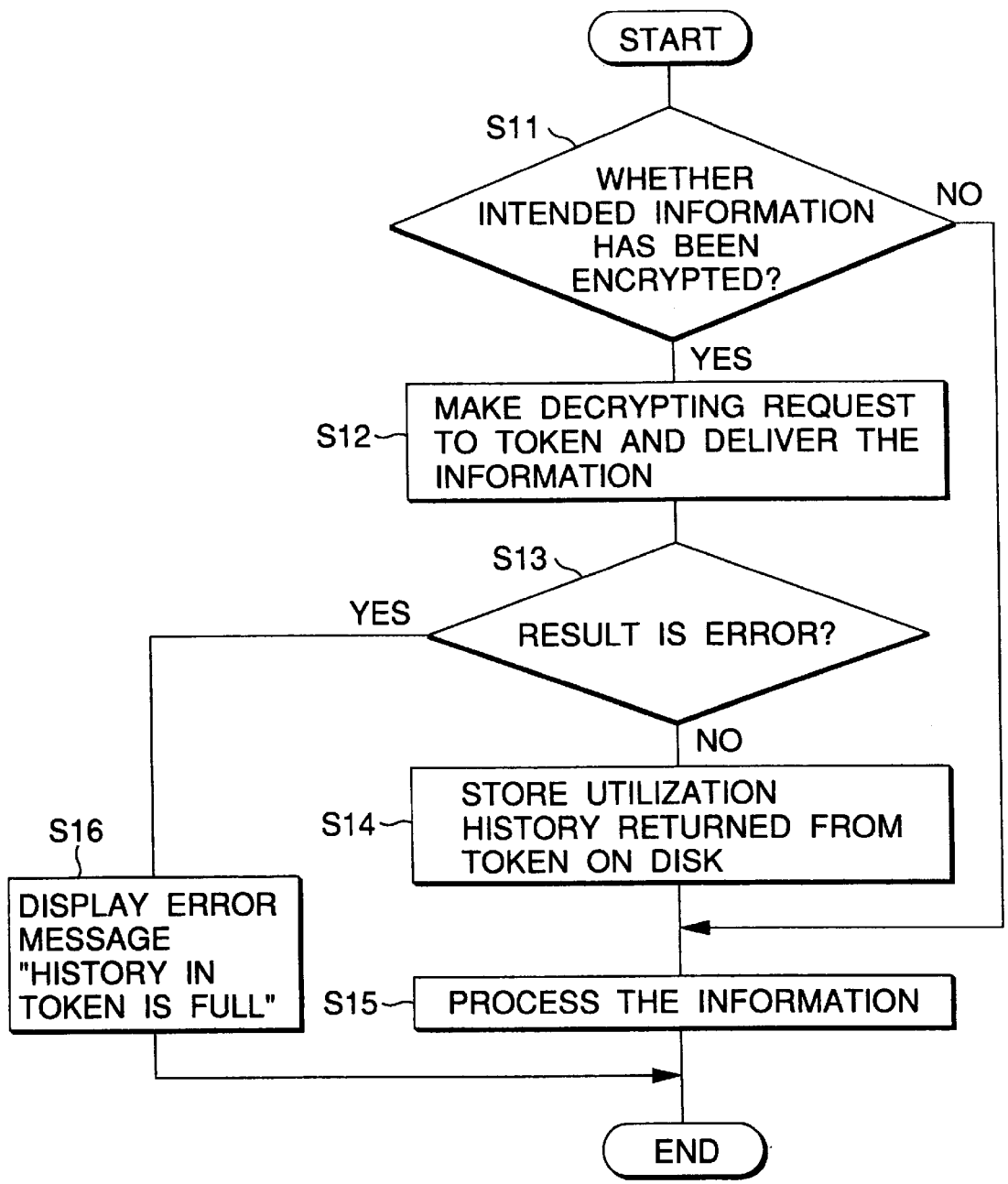

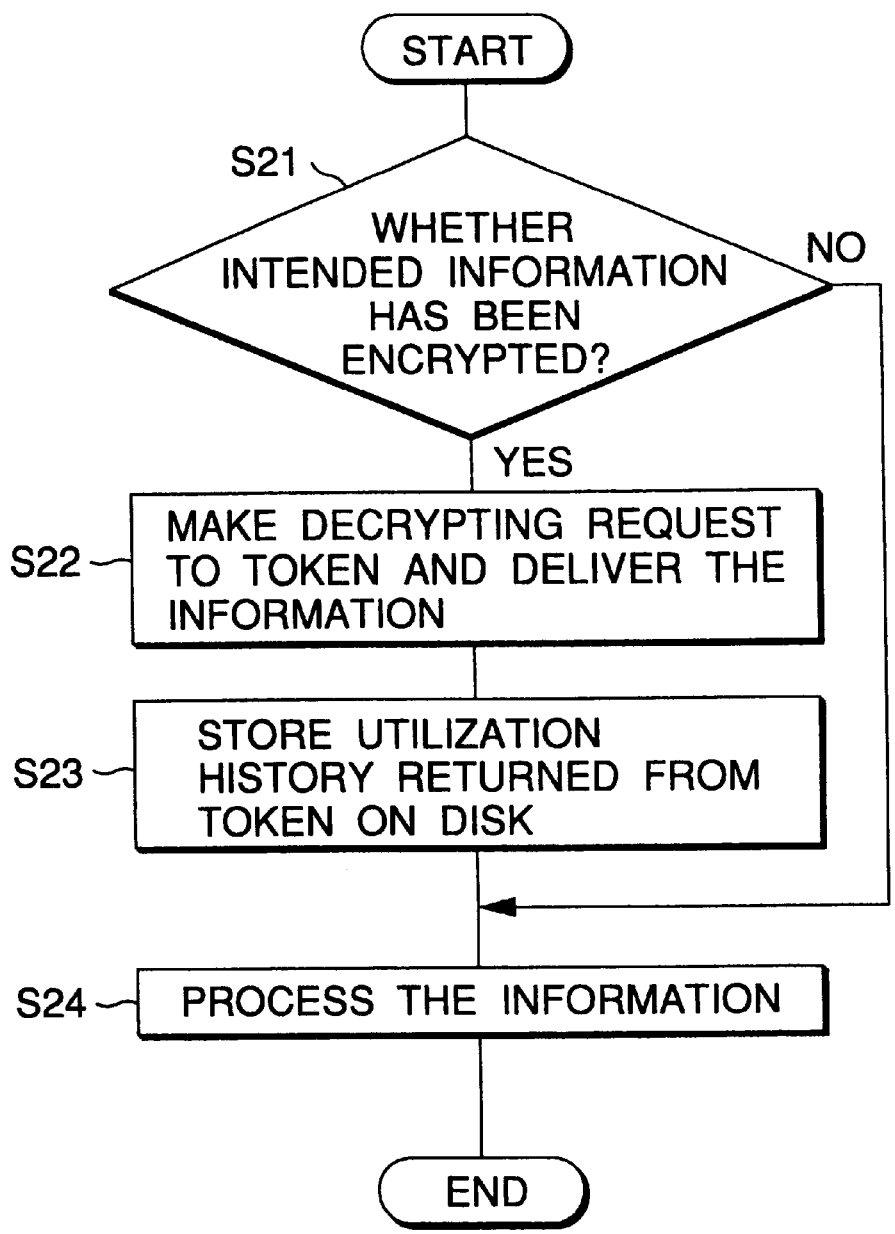

PROCESSING WHEN INFORMATION IDENTIFIER ID IS
DELIVERED AND CALLED FROM DECRYPTING UNIT

PROCESSING IN VERIFICATION-VALUE
CREATING UNIT OF TOKEN

PROCESSING IN CONTROL UNIT
OF TOKEN IN EMBODIMENT 2

PROCESSING IN CONTROL UNIT
OF TOKEN IN EMBODIMENT 2

UTILIZATION HISTORY RECORDED IN HISTORY
HOLDING UNIT OF INFORMATION PROCESSING UNIT

UTILIZATION HISTORY SENT FROM
INFORMATION PROCESSING UNIT TO CENTER

CONTENTS OF NO.i UTILIZATION HISTORY

CONTENTS OF VERIFICATION VALUE WITH SIGNATURE

MESSAGE SENT FROM CENTER TO USER

CONSTRUCTION OF UTILIZATION HISTORY AND
VERIFICATION VALUE IN EMBODIMENT 2

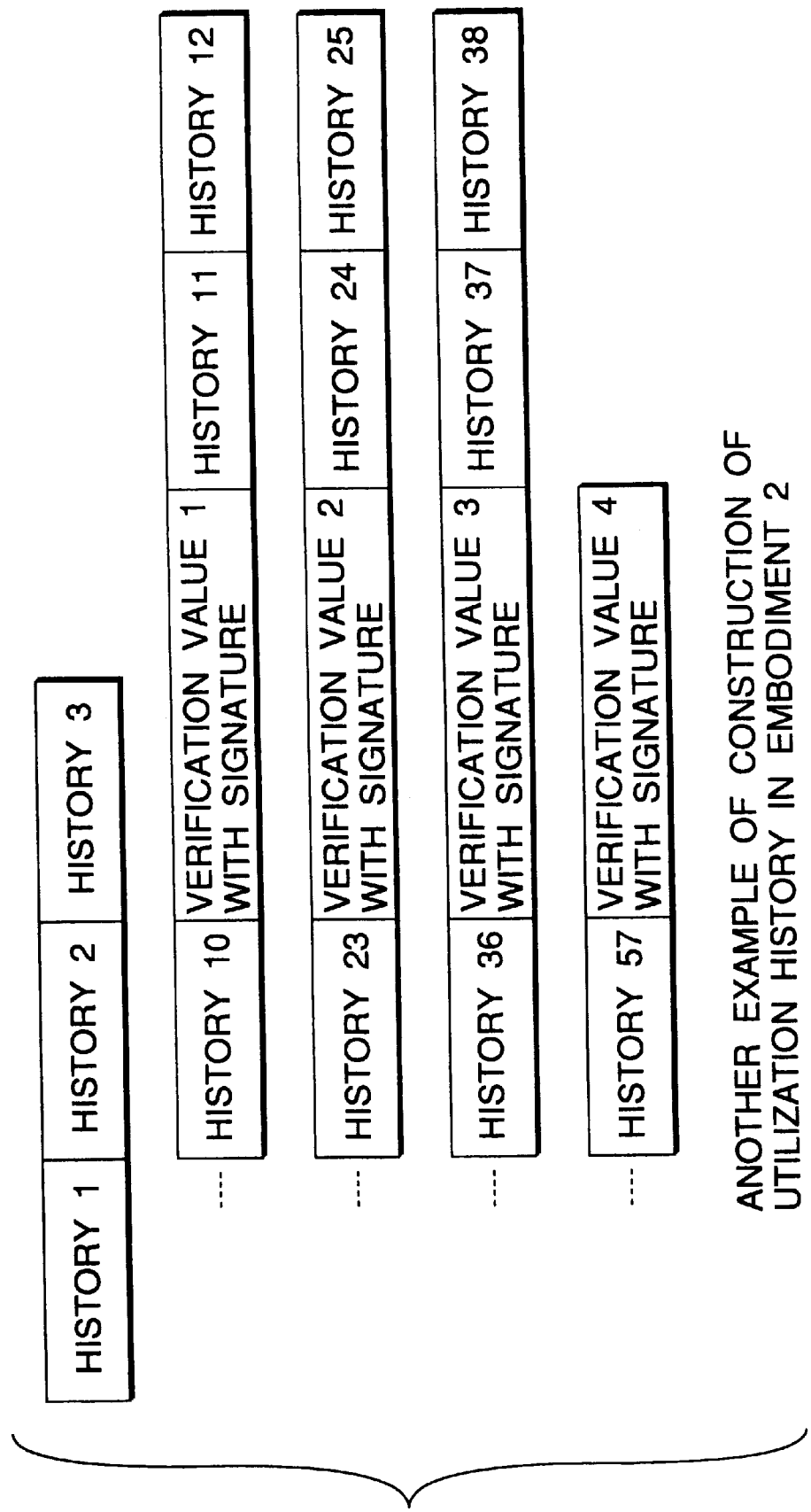

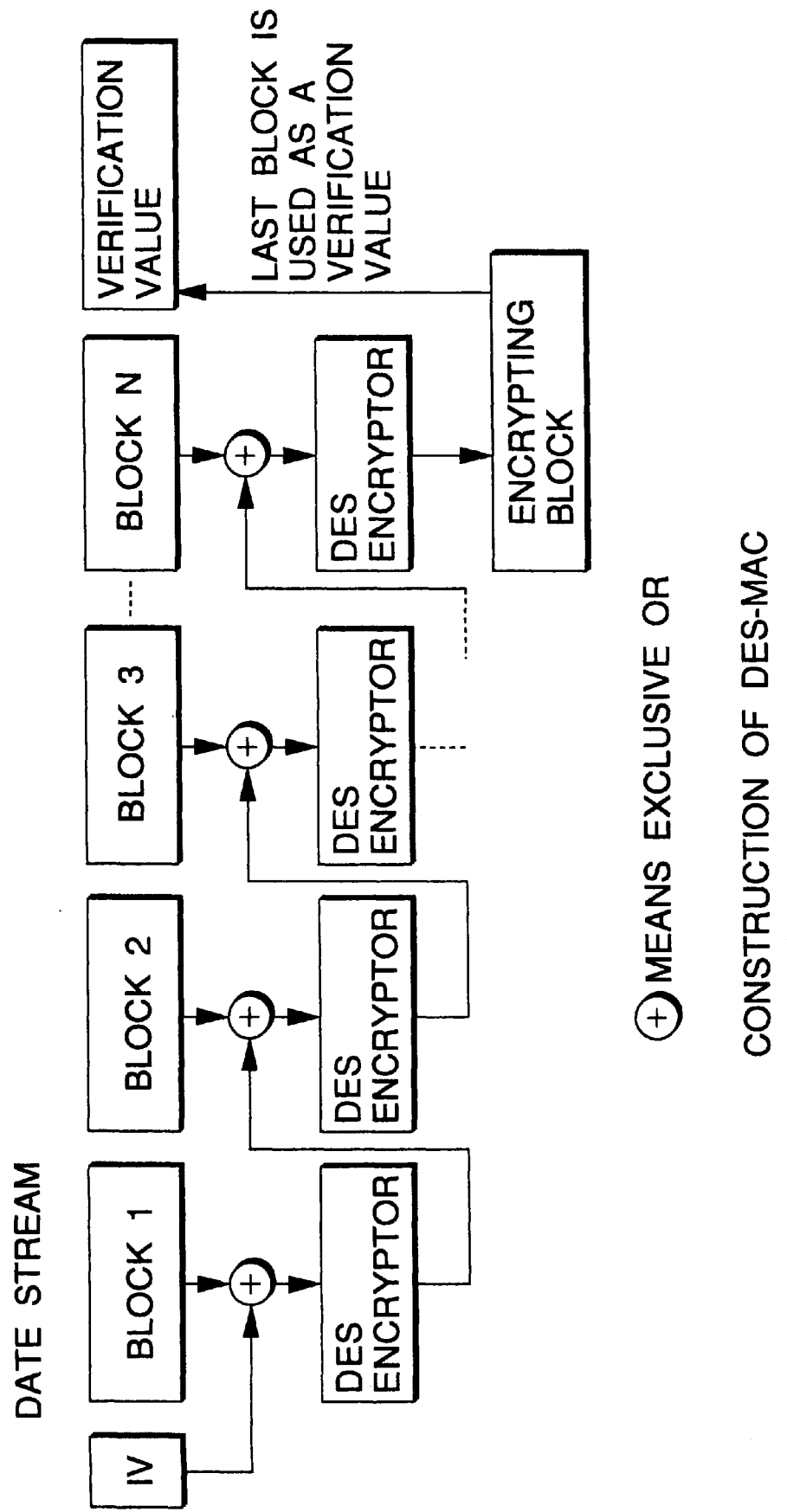

DATA VERIFYING METHOD APPARATUS FOR CREATING DATA TO BE VERIFIED AND DATA VERIFYING APPARATUS

BACKGROUND OF THE INVENTION

1. Field of Invention

The present invention relates to the technology of verifying data and more particularly to data-verifying technology fit for use in general information processing units designed to transmit or hold a large continuous number of data groups, such as, for example, a utilization history in security.

2. Description of Related Art

With the recent progress of digital information processing technology, all types of information is digitized. Additionally, with the idea of, for example, an information superhighway, the time has finally come when digital information can be distributed and circulated through networks. Various types of information can be circulated and distributed via Internet, telecommunications, personal computer or CD-ROM in the form of images, animation, voice, programs and the like, to say nothing of character information.

However, digital information in the form of characters, images, animation, voice, programs and the like is of no value unless that information is utilized. Furthermore, digital information is different from physical matter in that digital information is immaterial and easy to copy at low cost. Because digital information is easy to copy and easy to copy at low cost, restrictions have been imposed on the unauthorized copying of owned digital information. Unfortunately, however, the features that make using digital information attractive are, at times, governed by arbitrary rules.

In order to keep unauthorized users from copying and/or utilizing certain information, a system of making digital information utilizable only after decrypting the information can be used. Specifically, the digital information, as represented by programs, is encrypted so the digital information is freely distributable. Then, to utilize the digital information, a user pays for and receives a decrypting key to access the digital information. Alternatively, there has also been proposed a system of charging a payment for the utilization of information such as a software service system as disclosed in Japanese Patent Publication No. 95302/1994 and an apparatus for measuring the quantity of utilized information as disclosed in Japanese Patent Laid-Open No. 21276/1995.

With the aforementioned technologies, users do not have to buy, for example, software when the software, as represented by programs, is utilized over personal computers and workstations. Users are originally able to acquire the software free of charge or at a moderate price. The user is then charged in proportion to the quantity of the digital information that is utilized, for example, each time the software is used.

In order to correctly charge a user for the utilization of digital information, each individual user must be charged according to the duration and frequency of use. In some cases, the charges collected from an individual user must be distributed among several different information providers. Thus, each information provider must be paid in proportion to the length of time that that particular information providers' information was used. Consequently, a utilization history must be recorded and recovered accurately and safely.

Although a utilization meter that records a utilization history has been mentioned in Japanese Patent Laid-Open No. 21276/1995, no reference has been made of how to recover the utilization history actually recorded therein.

One method for recovering the utilization history has been proposed that does not use a recording device that is under the control of an information processing device or a user, such as, for example, a hard disk. In contrast, this method utilizes an independent safety device to store the utilization history. According to Japanese Patent Publication No. 95302/1994, for example, a utilization history can be written to an integrated circuit (IC) card.

In a chargeable information transmitting system according to Japanese Patent Laid-Open No. 25605/1991 and a chargeable information collecting system according to Japanese Patent Laid-Open No. 180762/19.94, chargeable information is recovered through networks.

One proposed method of recovering a utilization history that has been written to a safety device, such as, for example, an integrated circuit (IC) card, allows a authorized collector to collect the utilization history directly from the safety device via a network.

Under the current method of collecting the history through a network, however, no consideration has been given to the safety of the utilization history information. For example, the possibility of falsification of utilization history information as or before the utilization history information is transmitted or the possibility of transmission of dishonest utilization history information from any one of the users. Therefore, although this method is appropriate for in-house networks that can be relied upon to a certain degree, the method remains inappropriate, in view of safety, to networks open to the general public, such as, for example, the Internet. However, this method has been the only way for an authorized collector to safely recover the utilization history from an IC card in an apparatus.

With the recent development of encrypting technology, and the use of digital signature technology in particular, it is possible to solve the aforementioned problem. More specifically, a private key peculiar to a particular safety device is enclosed in the safety device and when a user retrieves data from the safety device, the user must provide a digital signature before retrieving the data. Thus, the utilization history data can be verified later by verifying the digital signature accompanying the data.

A technique of using RSA (Rivest-Shamir-Adleman) cryptosystem for digital signatures is widely known. However, signatures by means of RSA or any other digital signatures generally require a large quantity of calculations and a great deal of time per process. Therefore, a serious problem is posed when a signature has to be provided for continuous data in great quantities or when a computer with low calculating capability is used for processing signatures.

When the IC card is used as a safety device for recording the utilization history, the calculating capability of a central processing unit (CPU) mountable in the IC card is often rather low. Thus, a great deal of time is required when the CPU is used to carry out a large quantity of calculations. Unfortunately, increasing the calculating capability to raise the calculating speed is extremely costly.

Furthermore, because the data regarding the utilization history is usually relatively large, recording capacity becomes a problem when total data concerning the utilization history is recorded in a small device like an IC card.

The security of modern encryption technology including the RSA was originally based on the quantity of calculations and the length of the key used for a signature and cryptosystems is arranged so that it is increased as the capabilities of the computer increase. Consequently, this problem is not resolved by merely increasing the capabilities of a computer. The problem still awaits a solution since equipment can be used, such as, for example, a personal token, that is only capable of employing a computer whose processing performance is low in comparison to the highest performance that can be offered by the latest computer.

SUMMARY OF THE INVENTION

An object of this invention is to provide a method of creating data that is verifiable at high speed even by an apparatus having low calculating capability.

More specifically, the total utilization history is not held in an IC card, only verification values obtainable from the utilization history are held in the IC card. The utilization history is held on a part of an information processing unit, such as, for example, a personal computer or the like, that is controlled by a user.

Referring to the prior art in view of the verification values, there is technology employed for data communication, called Data encryption Standard-Message Authentication Cryptosystem (DES-MAC). Message Authentication Cryptosystem (MAC) has a predetermined length showing that a message is complete (i.e., any message that has not been altered dishonestly). The cryptosystem is used after being attached to an original message. Since the occurrence of an error during the data communication is fatal, a change in data during the data communication can be detected.

Additionally, Data encryption Standard (DES) is a block encryption algorithm (Applied Cryptography pp 265) with 64 bits used for one block. A CBC (Cypher Block Chain) mode (Applied Cryptography pp 193, JIS-X5051) is one way of using block cryptosystems as represented by DES. In this manner, an individual block is not encrypted independently but is exclusively ORed with a block encrypted immediately before and a block encrypted immediately after so as make the value obtained a DES input. Even when blocks having the same contents under this system are encrypted and when the block that has been encrypted until then is different, the encrypted result will also become different.

The DES-MAC (Refer to Applied Cryptography pp 455 for CBC-MAC) is an application of the CBC mode in the DES, according to which the block obtained last is used for the verification value of the total data stream.

FIG. 21 shows an arrangement of DES-MAC. A stream of data to be transmitted is shown in the upper portion of FIG. 21. The data stream is divided into blocks each having 64 bits. The Initial Vector (IV) represents an initial value formed of random numbers. The blocks resulting from the division is passed in a chain through DES encryptors as in the DES-CBC mode by adding the IV to the head of the data stream and the block obtained last to the last position thereof as the verification value of the data stream for transmission. On the reception side, a verification value is obtained by performing the process in reverse order. The value is then compared with the value received for verification.

This processing method is intended for data transmission by means of communication. Since a sender sets it forth as a premise to hold complete data in a short time with certainty, a problem will develop if the premise is applied to the recovery of a complete history. This is because history data is accumulated over a long period of time, during which the data may arbitrarily be controlled by users or the system may have accidents and thus the history data may be exposed to danger.

To begin, the DES-MAC system is base on the assumption that the data blocks are continuously transmitted. In other words, for the transmission of ordinary data, there exists a lower layer (equivalent to a TCP layer in TCP/IP: transmission control protocol/Internet protocol) and the order of data blocks is assured by that layer.

If, however, the utilization history is put under the control of the user, the order of histories becomes unverifiable at that point of time; that is, when the user is allowed to use the IC card by connecting it to a plurality of computers (e.g., desk top PC, a lap top PC, etc.) that the user can use. When it is considered that the utilization history is recorded on the computer side, the utilization history is scattered in a plurality of computers. Consequently, when the utilization history is scattered in the plurality of computers the utilization history is deprived of the time order.

In the case of a utilization history, the time order is an extremely important factor because the utilization history may be calculated from the plurality of continuous utilization histories. For example, there is a simple case where utilization time is calculated from the difference between utilization start time and utilization end time. However, utilization time can also be determined by calculating a difference in data length from data length as an object of operation at the utilization start time and from data length as an object of operation at the utilization end time; and so forth.

The DES-MAC has furnished no substantial solutions to the foregoing problems.

A further problem arising when the utilization history is put under the control of the user is that part of the utilization history may be lost intentionally or by accident. In the case of DES-MAC, verification becomes impossible if part of the utilization history is lost. Since the DES-MAC is based on the assumption that the sender holds complete data only during the communication, carrying out retransmission will resolve the problem. However, loss of the utilization history means the substantial loss of data and therefore the restoration of the history becomes impossible. The still continuous use of the DES-MAC system makes even the verification of the remaining data impossible.

In a system of charging a payment for usage, it is imperative that the user recover the utilization history. Unless the utilization history is recovered, the utilization fee charged against the user will be uncalculable or the collected utilization fee will be undistributable to the various information providers.

Thus, the utilization history must be recovered safely without the utilization history being recovered under false recovery instructions.

This invention provides an apparatus capable of verifying lengthy data quickly even with when the apparatus has low calculating capability and small storage capacity.

This invention separately provides a method of making data order restorable even in such an environment that the order is not preserved.

This invention separately provides a method of making the remaining data verifiable even when part of the data is lost.

This invention separately provides a method of controlling a data-holding apparatus safely from the outside.

In order to reduce the quantity of data to be held according to the methods of this invention, data is not recorded in a protective apparatus. Instead, the data is output from the protective apparatus and the verification values, which are small in data quantity, are held in the protective apparatus. More specifically, unidirectional functions are used in place of digital signatures for verification so that the data may be verified quickly. When hash functions representing MD5 are realized in software, hash values result in greater speed by three digits than the encrypting process of RSA. In order to make the order of utilization history data restorable, restorable information is added to the order of utilization history data. More specifically, it has been arranged that the value provided with a signature of a authorized person is necessitated with respect to the verification value held by the protective apparatus, whereby the verification value in the protective apparatus is sent to the authorized person to ensure that the verification is effected.

A description will subsequently be given of the constitution of the present invention. A data verifying method according to this invention comprises the steps of: creating a verification value of a data body inside a protective apparatus from a verification value of the relevant data body out of a plurality of data bodies generated in sequence and a verification value of a data body preceding the relevant data body, creating a verification value with a signature by adding a digital signature inside the protective apparatus to the verification value created for the last data body out of the plurality of data bodies to be verified at a time, sending the verification value with the signature outside from the protective apparatus, and verifying the plurality of data bodies based on the plurality of data bodies and the verification value with the signature.

With this arrangement, it is only necessary to provide the verification value with the digital signature even though the calculating capability is low. Since the verification can be calculated from the verification value with respect to the preceding data body and the data body this time, the processing is performable as long as one data body and one verification value are holdable, which means the storage capacity may be small.

In various exemplary embodiments, this invention further provides an apparatus for creating data to be verified with: means for generating data bodies in sequence, verification value holding means for holding verification values, verification value creation means for creating a new verification value from the verification value held in the verification value holding means and a newly generated data body and updating the verification value held in the verification value holding means to the new verification value, and signature means for attaching a signature to the verification value held in the verification value holding means at predetermined timing, wherein the verification value creation means, the verification value holding means and the signature means are installed in a protective apparatus.

Even with this arrangement, it is only necessary to provide the verification value with the digital signature even though the calculating capability is low. Since the verification can be calculated from the verification value with respect to the preceding data body and the data body this time, the processing is performable as long as one data body and one verification value are holdable, which means the storage capacity may be small.

In various exemplary embodiments, this invention further provides a plurality of data bodies generated in sequence, means for receiving a verification value with a signature resulting from providing a signature for the verification value calculated from the plurality of data bodies, signature verifying means for verifying the signature on the verification value received, and verifying means for verifying the correctness of the plurality of data bodies received from the verification value with the signature verified by the signature verifying means.

With this arrangement, the quantity of calculations is reducible since the verification of the signature is effected for only the verification value with the signature.

In various exemplary embodiments, this invention further provides a utilization history holding method for holding in a protective apparatus only a verification value resulting from sequential calculations with respect to a group of utilization history data comprising a plurality of continuous utilization history data, and for providing a signature for only the verification value when the verification value is output from the protective apparatus outside.

With this arrangement, not only the quantity of calculations but also the storage capacity can be suppressed.

In various exemplary embodiments, this invention further provides a utilization history holding apparatus with: data input means for inputting a plurality of continuous data, data processing means for processing the data, verification value creation means for creating a verification value with utilization history data relevant to the data processing and the verification value held at this point of time as inputs, verification value holding means for holding the verification value thus created, and signature means for providing a signature for the verification value, wherein the verification value creation means, the verification value holding means and the signature means are at least installed in a protective apparatus.

With this arrangement, not only the quantity of calculations but also the storage capacity can be suppressed.

With this arrangement likewise, unidirectional functions may be used for calculations applicable to the verification value creation means. The utilization history data may be in the form of a combination of the utilization history data body and the verification value at the time the utilization history data is processed. Further, counter means for doing counting each time data is processed may be provided and the utilization history data in the utilization history data group may be in the form of a combination of the value of the counter when the data is processed and a utilization history body. The verification value with the signature may be output in compliance with a user's request. The utilization history holding means may comprise a single CPU with software and when the load of the CPU applied by the data processing means is low, the signature means may creates and outputs the verification value with the proper signature.

With this arrangement, further, function stopping means may be provided and used for stopping the function of the data processing means at a point of time the verification value is output until a proper instruction is given from the outside. Halt condition holding means may be provided and used for stopping the function and when the conditions described in the halt condition holding means are met, the function halt means may output the verification value with the signature written thereto and stop its function. Further, public-key holding means may be used for holding a public key of an external authorized person, and the function halt means may verify that an accepting instruction is intended to restore the function corresponding to the lastly-output verification value provided with a digital signature made by the external authorized person and that by verifying the signature with the public key held by the public-key holding means at the time of receiving the instruction, whether the verification value with the signature is equal to the verification value held by the verification value holding means.

In various exemplary embodiments, this invention further provides a utilization history verifying apparatus with: data input means for inputting a verification value with a signature, the signature being provided for the verification value calculated from a plurality of continuous utilization history data in group and from the data groups, signature verifying means for verifying the signature of the verification value thus received with the signature, and verifying means for verifying the correctness of the data group received from the data group received and the verification value whose signature has been verified.

With this arrangement, the quantity of calculations is reducible since the verification of the signature is effected for only the verification value with the signature. With this arrangement, further, previous verification value storage means may be provided and used for storing the verification value received the last time, and the verifying means may employ the previous verification value when making verification. The calculations for use in the verifying means may be based on unidirectional functions. The utilization history data may be in the form of a combination of the utilization history data body and the verification value at the time the utilization history data is processed. The utilization history data in the utilization history data group may be in the form of a combination of the value of the counter when the data is processed and a utilization history body.

In various exemplary embodiments, this invention further provides a utilization history holding apparatus with: data storage means for holding data, halt condition holding means for holding predetermined conditions at the time the function is stopped, function halt means for stopping the function when the conditions held in the halt condition holding means are met and keeping the function stopping until a proper instruction is received from the outside, private-key holding means for holding a private key, digital signature means for providing a digital signature using the private key held in the private-key holding means for the data group held in data holding means, digital signature holding means for holding the digital signature affixed, and public-key holding means for holding the public key of an external authorized person, wherein the function halt means may verify that an accepting instruction is intended to restore the function corresponding to the digital signature provided by the external authorized person for the digital signature held in the digital signature holding means and that by verifying the signature with the public key held by the public-key holding means at the time of receiving the instruction, whether or not the value with the signature is equal to the value held by the digital signature holding means.

With this arrangement, the instruction with the signature of the proper person is not sent until the correctness of the utilization history is verified, and the halt state of the apparatus is not release not until the correctness of the instruction is verified.

Therefore, no inconvenience arises from the provision of service while the correct utilization history remains unrecovered. In other words, it is ensured that the correct utilization history is recovered.

In various exemplary embodiments according to this invention, electronic equipment is provided with: function halt means for stopping at least part of the function of an electronic equipment body when predetermined conditions are met, means for outputting predetermined data outside, means for receiving data with a signature, the data being created by providing the signature for the predetermined data, signature verifying means for verifying the signature with respect to the data with the signature, and means for releasing the halt state of that part of the function when the correctness of the signature of the data with the signature is verified by the signature verifying means.

With this arrangement, the use of the electronic equipment is not made to continue until the correctness of the data is verified, so that correct data is secured.

Further, this invention can be implemented by appropriating part thereof to a computer program product.

The above and other objects and features of the present invention will be more apparent from the following description taken in conjunction with the accompanying drawing.

BRIEF DESCRIPTION OF THE DRAWINGS

FIG. 1 is an overall block diagram of Embodiment 1 of the present invention;

FIG. 2 is a block diagram showing the construction of an information processing unit 11 of FIG. 1;

FIG. 3 is a block diagram showing the construction of a token 12 of FIG. 1;

FIG. 6 is a diagram explanatory of information to be decrypted in the token 12;

FIG. 8 is a flowchart explanatory of processing to be performed in the control unit 14 of the information processing unit 11 when a request for the utilization of information is received from a user;

FIG. 9 is a flowchart explanatory of processing to be performed in the control unit 14 of the information processing unit 11 when an instruction for the recovery of the utilization history is received from a user;

FIG. 20 is a diagram explanatory of another construction of the utilization history of Embodiment 2; and FIG. 21 is a diagram explanatory of relevant technology.

DETAILED DESCRIPTION OF PREFERRED EMBODIMENTS

Figure 4:
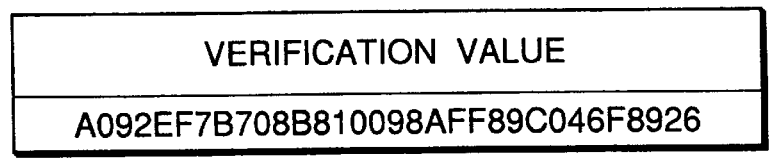
FIG. 4 is a diagram explanatory of a utilization value holding unit 21 of FIG. 3.

Now, a description will be given in more detail of preferred embodiments of the invention with reference to the accompanying drawings.

(Embodiment 1)

Embodiments of the present invention will subsequently be described. First, Embodiment 1 of the present invention will be described. In a system to be described in Embodiment 1 of the present invention like any other systems according to the present invention as those which will be described later, general digital information, such as, for example, programs and image information that are encrypted and distributed, is utilized in an information processing unit like a personal computer or a workstation by means of an IC card (hereinafter called the "token") connected to the information processing unit in order to record the utilization history then by seizing timing at which the information is decrypted, whereby to make the center recover the utilization history. Needless to say, the present invention is applicable to any task other than securing history data.

FIG. 1 shows an overall system configuration according to this embodiment of the invention. In FIG. 1, there is shown an information processing unit 11 like a personal computer or a workstation for use in utilizing digital information in the user environment and in order to decrypt encrypted information (or to decrypt a key for decrypting, a token 12 for recording the utilization history by seizing the timing is connected to the information processing unit. The token 12 and the information processing unit 11 may be connected via any means capable of transmitting information such as a PC card (PCMCIA: Personal Computer Memory Card Interface Association) interface, serial/parallel, an infrared ray and the like. The token 12 may be packaged in the information processing unit 11.

The user's information processing unit 11 is connected to a recovery unit 13 constituted of an information processing unit such as a workstation or a large computer on the center side. The connection may be in the form of a modem-to-telephone line or a network interface like Ethernet. The connection is not maintained at all times and may be made only when the recovery of the utilization history from the user's information processing unit 11.

FIG. 2 shows the construction of the information processing unit 11 on the user side. The user's information processing unit 11 may be a personal computer or a workstation for general use. The only difference is that the token 12 is connected to the information processing unit 11. The information processing unit 11 includes a control unit 14, and information holding unit 15, a history holding unit 16 and an information transmission unit 17. With this arrangement, a recording medium 11a stored with a program, for example, is used to install the program.

While communicating with the token 12, the control unit 14 performs the following processes including:

(1) reading the encoded information stored in the information holding unit 15, transferring the information to the token 12 for decrypting purposes and executing or processing the information;

(2) receiving the utilization history transferred from the token 12 simultaneously when the decrypted data is received and storing the utilization history in the history holding unit 16; and (3) issuing a "verification value output" command to the token 12 on receiving an instruction from the user and transferring the utilization history provided with a digital signature to the information transmission unit 17.

The information holding unit 15 is stored with data, information or decrypted data to be utilized by the user. Actually, the information holding unit 15 is formed with an external storage device like a memory or a hard disc device.

The history holding unit 16 is stored with the history transferred from the token 12 via the control unit 14. Actually, the history holding unit 16 is formed with an external storage device like a memory or a hard disc device. The specific construction of a history will be described later.

On receiving command from the control unit 14, the information transmission unit 17 reads out the history held in the history holding unit 16 together with the utilization history transferred from the control unit 14, and transmits the history to the recovery unit 13 of the center. The information transmission unit 17 is actually constituted of a modem and a telephone line or a network interface such as Ethernet. However, a device such as a floppy disc instead of Ethernet is used to store the data, so that the user may manually input it to the recovery unit 13 of the center.

FIG. 3 shows the construction of the token 12 on the user side. The token 12 is physically and generally constituted of MPU, a memory and the like. The token 12 itself is contained in a container resistant to a physical attack from the outside. Since the attach-resistant container is technologically well known (Japanese Patent No. 1860463, Japanese Patent Laid-Open No. 100743/1991, etc.), the description thereof will be omitted. To what extent the container is resistant varies with the degree of security of the data involved. There is a case where the preparedness for such an attack may be weak.

The token 12 is connected to the user's information processing unit 11, performs predetermined processing according to an instruction from the information processing unit 11 and returns the result thereto. The token 12 comprises a user private-key holding unit 18, a decryptor unit 19, a utilization-value creating unit 20, a utilization-value holding unit 21, a utilization-value output unit 22, a token private-key holding unit 23, a digital signature unit 24 and so forth. Each of the components of the token 12 will be described later. The token 12 has the following functions:

(1) Information decrypting function with holding of the utilization history including:

(i) receiving encrypted data from the information processing unit 11, decrypting the data with the private key stored in the user private-key holding unit 18, and returning the decrypted data to the information processing unit 11;

(ii) performing the decrypting process simultaneously with referring to the header of the decrypted data and the identifier written thereto, and returning the identifier to the information processing unit 11 as the utilization history; and further (iii) transferring the utilization history to also utilization-value creating unit 20, and causing the utilization-value creating unit 20 to make calculations with respect to the utilization history and the verification value held in the utilization-value holding unit 21 at that point of time.

(2) Verification value output function including:

providing a digital signature for the verification value held in the utilization-value holding unit 21 at that point of time on receiving an output request from the information processing unit 11, returning the verification value with the signature thereto, and erasing the data in the utilization-value holding unit 21.

A description will subsequently be give of each of the components of token 12.

In response to a decrypting request from the information processing unit 11, the decryptor unit 19 performs the decrypting process using a private key peculiar to the user held in the user private-key holding unit 18 and returns the result to the information processing unit 11 as encrypted data. At this time, the decryptor unit 19 simultaneously reads the header of the encrypted data, returns the information identifier written thereto to the information processing unit 11 as the utilization history and also to the utilization-value creating unit 20 (in this example, the information identifier of the information utilized is used for the utilization history).

With the arrangement like this, the user needs to gain access whenever the user utilizes information, so that the utilization history is recorded without fail.

In this case, the encrypted data transferred from the information processing unit 11 may be what is formed by encrypting information itself or a key for decrypting the encrypted information. In the case of the latter, the process of decrypting the information is performed on the side of the information processing unit 11.

The user private-key holding unit 18 holds a private key peculiar to the user. Generally, tokens 12 are distributed to users in such a form that a key peculiar to each user is enclosed beforehand at the token issuing center. Therefore, the user's private key remains unknown to the user himself.

The utilization-value holding unit 21 holds only one verification value which is updated in sequence. Generally, the verification value is a value having a fixed length of 16 bytes or the like. If a verification value has 16 bytes, only a memory of 16 bytes is employed, FIG. 4 shows an example of the formation of such a verification value.

On receiving a verification value output request from the information processing unit 11, the utilization-value output unit 22 functions as what reads the verification value stored in the utilization-value holding unit 21 at that point of time and returns the verification value to the information processing unit 11. At that time, the utilization-value output unit 22 calls the digital signature unit 24 and provides a digital signature for the verification value.

The digital signature unit 24 uses the private key held in the token private key holding unit 23 for holding a special private key for the token to perform the process of providing a digital signature for the given value. The token private key holding unit 23 is a constituent unit for holding the private key for the purpose of a signature used when a digital signature is made. For these constituent units, it is possible to use the digital signature technology such as RSA signature, of which the description will be omitted because it belongs to the prior art.

On receiving the utilization history (the information identifier in this case) from the decryptor unit 19, the utilization-value creating unit 20 reads the verification value held in the utilization-value holding unit 21 and calculates a new verification value from the utilization history and the verification value by making the following calculation.

[Numerical Formula 1]

H=Hash (Usage+Hold)

where H=new verification value, Hold=the present verification value, Usage=utilization history and Hash ( )=unidirectional function, MD and SHA (Secure Hash Algorithm) being actually employed. In this operation "+", numerical values may actually be added up or exclusively ORed on condition that both have the same length or otherwise two data may simply be arranged in order; in any one of the above cases, it is essential for the two values are synthesized. The utilization-value creating unit 20 stores the new verification value thus calculated in the utilization-value holding unit 21 (i.e., the new value is superscripted).

On receiving the output request from the information processing unit 11, the utilization-value output unit 22 returns the verification value held in the utilization-value holding unit 21 at that point of time and resets the utilization-value holding unit 21 to a predetermined value or may simply clear the verification value thus held therein.

Figure 5:
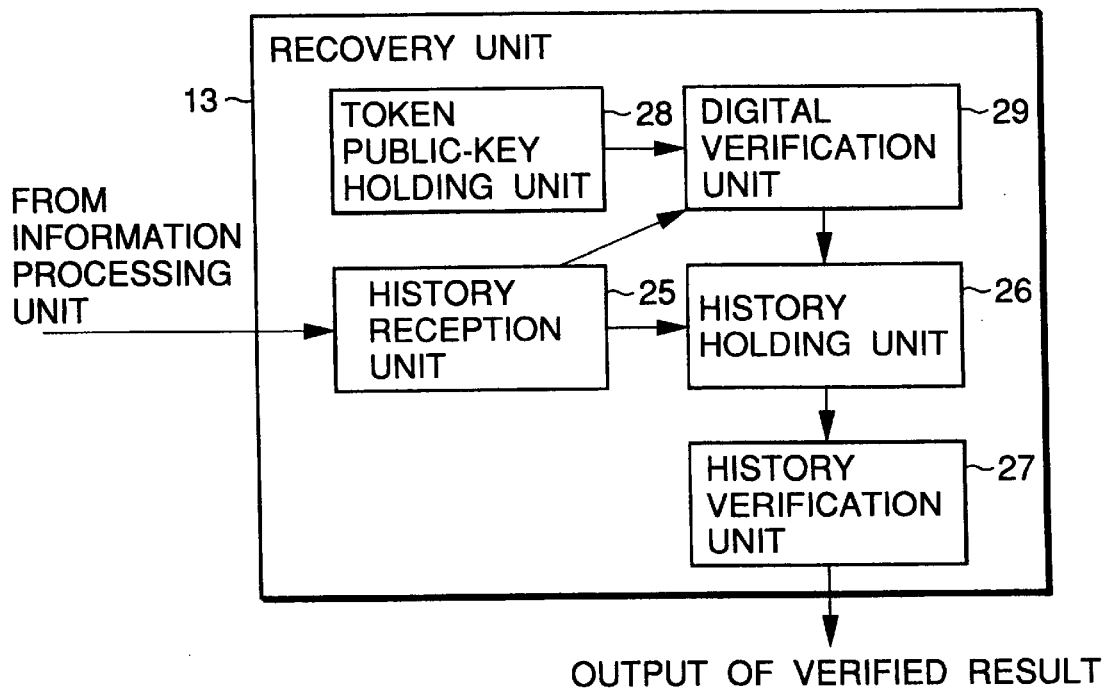
FIG. 5 is a block diagram showing the construction of a recovery unit 13 of FIG. 1.

The recovery unit 13 of the center will subsequently be described. FIG. 5 shows the construction of the recovery unit 13. As shown in FIG. 5, the recovery unit 13 comprises a history reception unit 25, a history holding unit 26, a history verification unit 27, a token public-key holding unit 28, a signature verification unit 29 and so forth. The recovery unit 13 causes the history reception unit 25 to receive the history sent from the information processing unit 11 of the user and stores the contents in the history holding unit 26. The utilization history stored is read by the history verification unit 27 where it is verified whether or not the history is correct, and then the verified result is sent to an administrator on the center side.

Then the center normally calculates information utilization fees in accordance with the contents of the history, collects the fees from users and performs the process of distributing the utilization fees and thus collected among information providers according to details of an information utilization history. However, the description of this matter will be omitted because it is irrelevant to the essence of the present invention.

A description will subsequently be given of each of the components of the recovery unit 13.

The history reception unit 25 receives the history information sent from the information processing unit 11. Actually, like the history transmission unit 17 of the information processing unit 11 (FIG. 2), the history reception unit 25 is constituted of a modem and a telephone line or a network interface such as Ethernet or an information input device from the outside such as a floppy disc. The utilization history received by the history reception unit 25 is stored in the history holding unit 26.

In order to verify whether the verification value sent from the information processing unit 11 is correct, further, there are provided the token public-key holding unit 28 and the signature verification unit 29.

When a history is transmitted from the information processing unit 11, the history reception unit 25 receives the history. The history received is stored in the history holding unit 26 and transferred to the signature verification unit 29. The signature verification unit 29 selects the public key of the token 12 connected to the information processing unit 11 that has sent the history from among the public keys of the plurality of tokens 12 stored in the token public-key holding unit 28, and verifies the signature of the history using the public key. The verified result is held together with the history stored in the history holding unit 26. When the verified result is proved to be false, processing thereafter is discontinued since there is some possibility that the verification value has been altered dishonestly or fabricated and the administrator outputs to that effect and stops the processing.

When the signature is verified, the following process is continued:

The history holding unit 26 holds the utilization history transferred from the history reception unit 25 and the verified result. The history holding unit 26 is actually formed of a storage device such as a memory.

The history verification unit 27 verifies the history held in the history holding unit 26 as follows:
(1) A series of histories are transmitted are defined as ud1, ud2, ud3 . . . udn;
(2) The verification value attached to the last position of the history is defined as hud; and
(3) Provided the initial value of the verification value is defined as ihud, it is examined whether hud' resulting from calculation becomes equal to the hud sent according to the following expression:
[Numerical Formula 2]

$$hud'=Hash\ (ud_n+Hash\ (ud_{n-1}+\ldots Hash\ (ud2+Hash\ (ud1+ihud))\ \ldots)\ .)$$
$$hud=?hud'$$

(4) If the equation is established, the verification value is judged that it has not been altered dishonestly but if not, it has been altered. The administrator of the recovery unit is then informed of the result.

A description will subsequently be given of the form of information to be processed in each unit.

FIG. 6 shows a form of encrypted information as an object of encrypting in the token 12: (a) refers to a case where information itself is encrypted with a user's private key; and (b) to a case where the private key used for initially encrypting the information is encrypted by a private key peculiar to the user before being decrypted and the private key peculiar to the information thus obtained is used for decrypting the information. In the case of (b), the information may be decrypted by the information processing unit, not by token 12. Further, a public key may needless to say be used, though a description has been give of an example using a common cryptosystem.

The information identifier is an identifier peculiar to the information given when the center encrypts the information for distribution. The information identifier is controlled by the center (e.g., with a database) and when the information identifier is specified, it is possible, for example, to specify a person who has prepared the information.

Figure 7A:
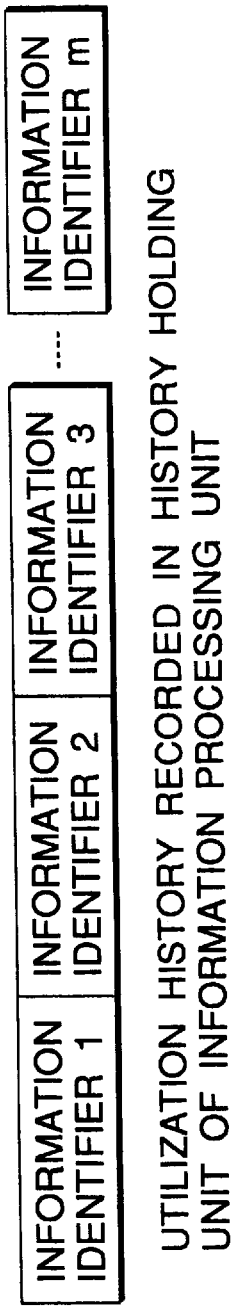
FIGS. 7A and 7B are diagrams explanatory of the construction of a utilization history.
Figure 7B:
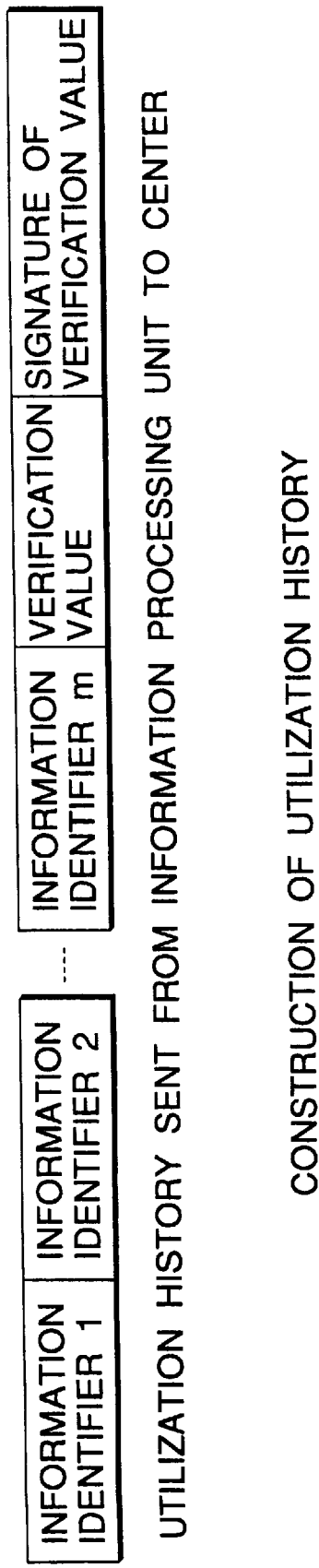

FIGS. 7A and 7B show a form of utilization history: FIG. 7A shows a form of utilization history recorded in the information processing unit 11 according to this embodiment of the invention, that is, a train of information identifiers (the information decrypted by the token) utilized; and FIG. 7B shows a form of the utilization history sent from the information processing unit 11 to the center, this form differs from that of FIG. 7A solely in that the verification value held by the token and the signature of the token with respect to the verification value are attached to the last position of FIG. 7A.

Although the individual utilization history is constituted of only the information identifiers utilized according to this embodiment of the invention, it may include any data, for example, utilization time, the identifier of the user, the quantity of utilization, an utilization fee and so on. In other words, the present invention is effective when various kinds of information are left as a history (various kinds of information are usually left as a history) since the individual history tends to become long.

Figure 10:
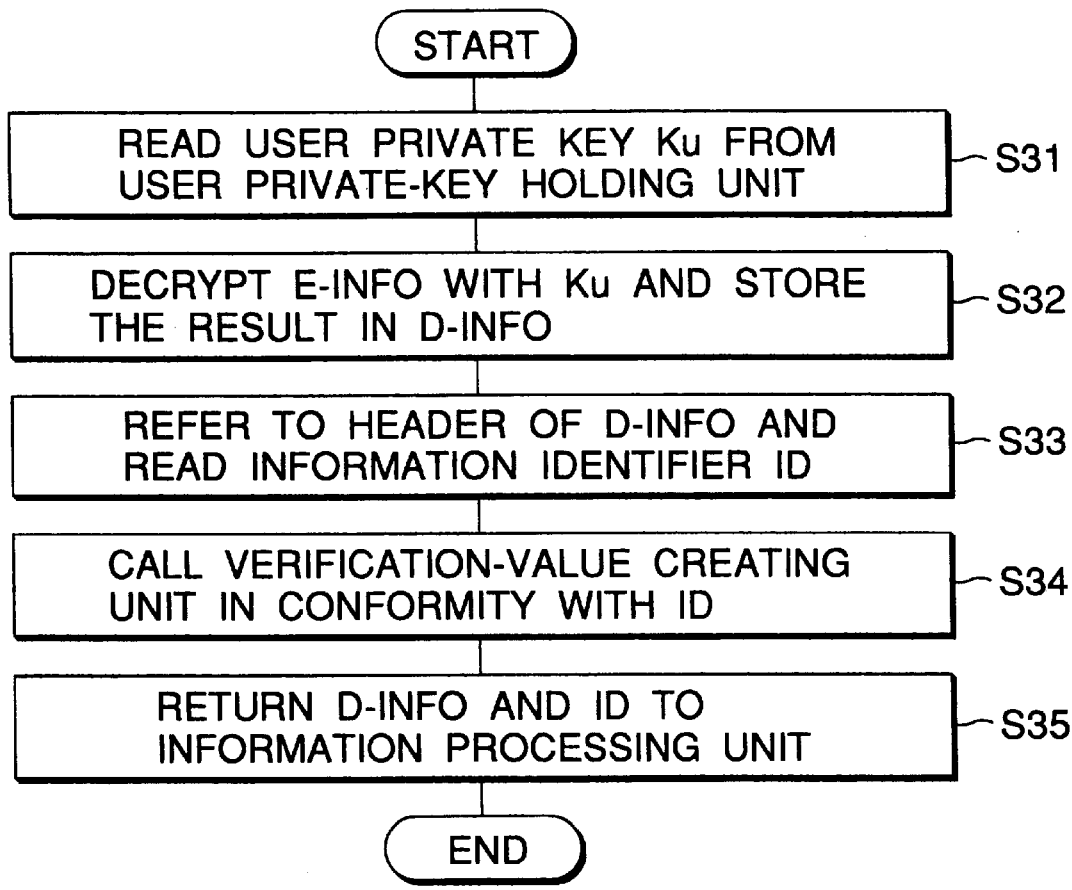
FIG. 10 is a flowchart explanatory of processing when the decryptor unit 19 of the token 12 receives a request for decrypting encrypted information from the information processing unit 11.
Figure 11:
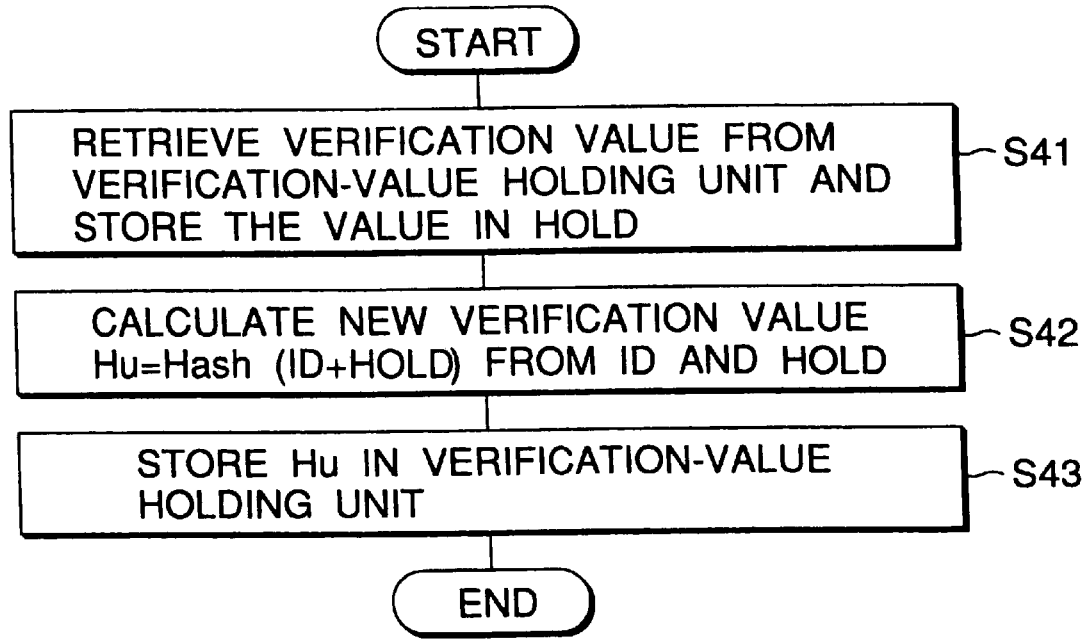
FIG. 11 is a flowchart explanatory of processing to be performed in the utilization-value creating unit 20 of the token 12 which is called from the decryptor unit 19 of the token 12.
Figure 12:
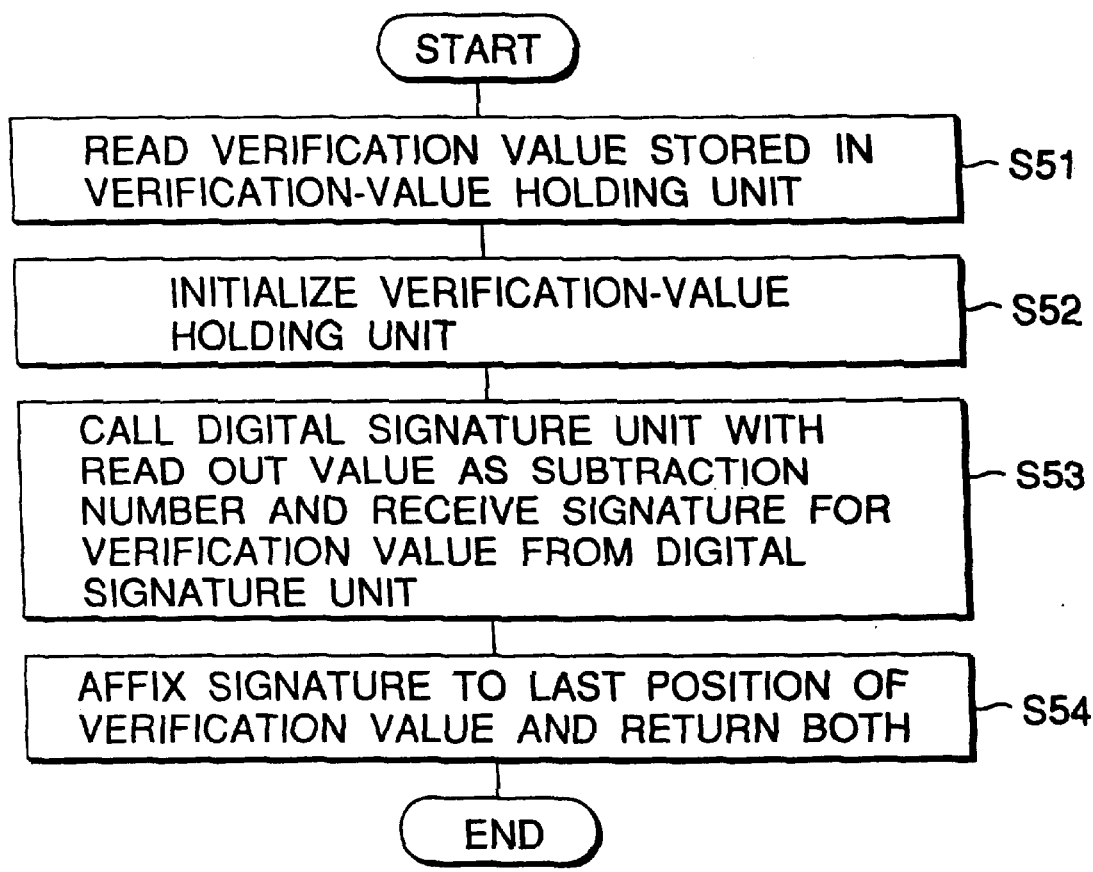
FIG. 12 is a flowchart explanatory of processing when the utilization-value creating unit 22 of the token 12 receives a verification value output request form the information processing unit 11.

Referring to FIGS. 8–12, there will be given a description of processing performed in the information processing unit 11 and the token 12. FIG. 8 refers to a processing flow when a request for the utilization of information is made from a user in the control unit 14 of the information processing unit 11. FIG. 9 refers to processing when an utilization history recovery instruction is given the user in the control unit 14 likewise. FIG. 10 refers processing when the decryptor unit 19 of the token 12 receives a request for decrypting the encrypted information from the information processing unit 11. FIG. 11 refers to processing in the utilization-value creating unit 20 of the token 12 when called by the decryptor unit 19 of the token 12. FIG. 12 refers to processing when the utilization-value output unit 22 of the token 12 receives a verification-value output request from the information processing unit 11.

As shown in FIG. 8, the following processing proceeds in the control unit 14 of the information processing unit 11 when a request for the utilization of information is made from the user. First, a decision is made as to whether the intended information has been encrypted (S11). If not encrypted yet, the information as it stands is processed (S15). If already encrypted, a decrypting request is made to the token 12 so as to transfer the intended information (S12). When an error is returned from the token 12, the processing is terminated after issuing an error message "the history of the token is full" (S13, S16). If no error is returned, the utilization history fed from the token 12 is recorded in a recording unit such as a disc (S14). Then the intended information is processed (S15).

As shown in FIG. 9, the following processing proceeds in the control unit 14 of the information processing unit 11 when the utilization history recover instruction is given by the user. First, a decision is made on whether the intended information has been encrypted (S21). If not encrypted yet, the information as it stands is processed (S24). If already encrypted, the decrypting request is made to the token 12 so as to transfer the intended information (S22). Then the utilization history returned from the token 12 is recorded in the recording unit such as a disc (S23). Thereafter, the intended information is processed (S24).

As shown in FIG. 10, the following processing proceeds when the decriptor unit 19 of the token 12 receives a request for decrypting the encrypted information from the information processing unit 11. First, a user private key Ku is taken out from the user private-key holding unit 18 (S31). The encrypted data is decrypted with the user private key Ku and the decrypted data is stored (S32). The header of the decrypted data is referred to so as to read an information identifier and with this identifier as a subtraction number, the utilization-value creating unit 20 is called and made to perform verification-value creating process (S33, S34, see FIG. 11). Then the decrypted data and the identifier are sent back to the information processing unit 11 (S35).

As shown in FIG. 11, the following processing proceeds when the utilization-value creating unit 20 of the token 12 receives a call from the decryptor unit 19 of the token 12. First, the verification value is taken out from the utilization-value holding unit 12 (S41). The information identifier and the verification value are subjected to hash calculation, and the calculated result is stored in the utilization-value holding unit 21 as a new verification value (S42, S43).

As shown in FIG. 12, the following processing proceeds when the utilization-value output unit 22 of the token 12 receives the verification-value output request from the information processing unit 11. First, the verification value stored in the utilization-value holding unit 21 is read out (S51). Then the contents stored in the utilization-value holding unit 21 are initialized (S52). With the verification value thus read as a subtraction number, the digital signature unit 24 is called so as to provide the verification value with a signature (S53). The signature is affixed to the last position of the verification value, and the verification value with the signature is output (S54).

The description of Embodiment 1 is terminated for the moment.

In a case where a user verifying apparatus and method as disclosed in Japanese Patent Application No. 62076/1996 are combined with the present invention, modulo n can be used as a information identifier by varying the modulo n in the calculation of power reside each time an access ticket is issued. More specifically, in the user verification technique of Japanese Patent Application No. 62076/1996, the access ticket (auxiliary information for verification) is received from the outside, so that encrypted data, for example, is decrypted by the use of the access ticket and the user verification information. Further, the modulo n used then is used as an information identifier. In this case, the modulo n is not taken out before being decrypted by the decriptor unit inside the token but given from the outside together with information as an object of encrypting.

With this arrangement, the capacity of the utilization-value holding unit 21 that has to be prepared within the token 12 can be minimized and t hereby the production cost of the token 12 is also made reducible.

(Embodiment 2)

Embodiment 2 of the present invention will subsequently be described. Embodiment 2 described herein has several functions in addition to those in Embodiment 1. The functions and effects will be enumerated as follows:

(1) The token 12 outputs the verification value and stops its function but recovers the function on receiving a message from the center.

When the verification value is output outside or when a predetermined time is passed by the use of a clock function, the token 12 outputs the verification value and stops at that point of time to urge the user to recover the history (or may autonomously stops so as to demand a verification value). In order for the user to have the function of the token 12 recovered, the only way is to send the history and the verification value to the center for verifying purposes and to receive a message for use in recovering the function from the center. The message issued by the center for the purpose of recovering the function is formed by providing the verification value sent from the user with the digital signature added by the center.

(2) The verification value is also output at a point of time the utilization history as its history is processed.

Not only the information identifier but also the verification value at the point of time the history is generated is contained in the contents of the utilization history, whereby strict control of the history (order) on the information processing unit side can be dispensed with since the continuity of the individual history is made examinable.

(3) An old verification value is held on the center side.

In the embodiments of the present invention up to now, the verification value within the token has been initialized in compliance with the output request from the user. However, this function can be dispensed with by making the recovery unit of the center hold the preceding verification value of the user.

Figure 13:
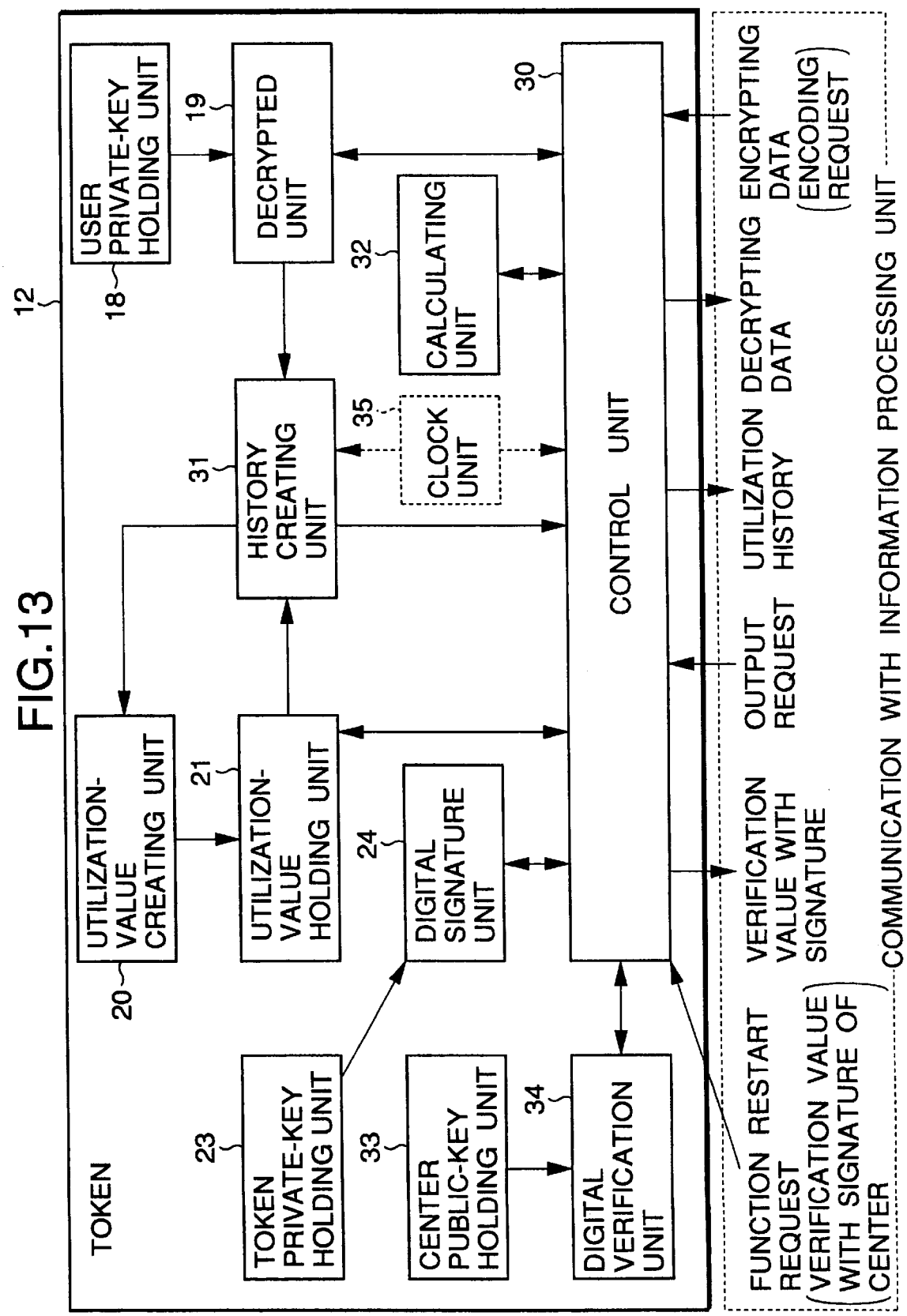
FIG. 13 is a block diagram showing the construction of the token 12 in Embodiment 2.

FIG. 13 shows the construction of the token 12 according to this embodiment of the invention, wherein like reference characters designate like or corresponding parts of FIG. 3 and the detailed description thereof will be omitted. As shown in FIG. 13, the token 12 comprises the user private-key holding unit 18, the decryptor unit 19, the utilization-value creating unit 20, the utilization-value holding unit 21, the token private key holding unit 23, the digital signature unit 24, a control unit 30, a history creating unit 31, a calculating unit 32, a center public-key holding unit 33, a signature verification unit 34 and so forth. A clock unit 35 may be provided, if necessary.

It is arranged according to this embodiment of the invention that communication with the information processing unit 11 is totally conducted via the control unit 30, which properly calls any other processing unit and performs processing, in compliance with a request from the information processing unit 11.

The control unit 30 holds the operating state of the token 12 therein, the operating state being divided into two modes: a normal mode and a halt mode. In the normal mode, the token 12 performs the decrypting process as described in Embodiment 1 in compliance with a decrypting request from the information processing unit 11. In the halt mode, on the other hand, the token 12 accepts no decrypting request but basically only a function restart request (verification value with the signature made by the center). The token 12 cancels the halt mode when the request is rightful and performs the process of transferring the halt mode to the normal mode (in addition, may also actually perform the process of outputting a verification value resulting from providing a signature for the verification value held in the utilization-value holding unit 21 at that point of time).

Transferring from the normal mode to the halt mode depends on the number of times the decrypting process, for example, is performed. The calculating unit 32 of FIG. 13 holds the number of times the decrypting process is performed. When that number of times exceeds a predetermined value (e.g., 100 times), for example, the control unit 30 returns a message "the time limit expired" to the information processing unit 11 and restores the halt mode.

When a clock is installed, information as to the preceding halt time held within the control unit 30 may be relied upon. In other words, on receiving a request from the information processing unit, the control unit compares the preceding halt time held in the control unit with the present time and returns the message "the time limit expired" to the information processing unit 11 when a predetermined period of time has passed (e.g., one month), and restores the halt mode.

Referring to FIGS. 4–16, there will be given a detailed description of processing to be performed by the control unit 30 of the token 12. Incidentally, the parts shown with dotted lines in FIGS. 14–16 represents not the process steps taken by the control unit 30 but those taken by relevant constituent units.

Figure 14:
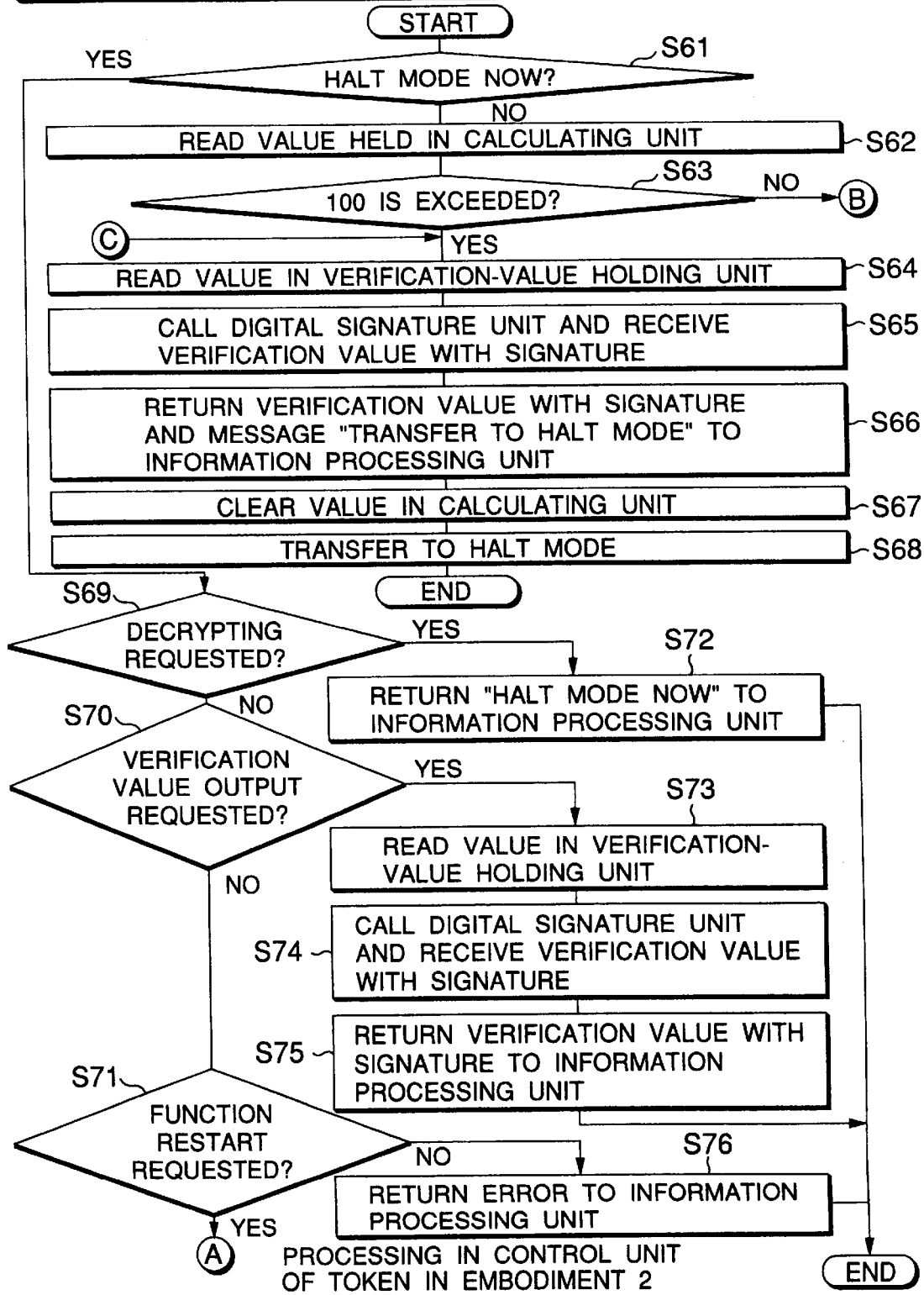
FIG. 14 is a flowchart explanatory of processing to be performed in the token 12 of FIG. 13.

In FIG. 14, one of the encrypting, verification-value output and function restart requests are input to the control unit 30 of the token 12 from the information processing unit 11. First, a decision is made on whether the mode of the control unit 30 is the halt mode (S61). Unless the halt mode is established, a count in the calculating unit 32 is read and a decision is made on whether the count exceeds, for example, 100 (S62, S63). If the count does not exceed 100, the flow proceeds to a node B of FIG. 16 where the decrypting process is performed. When the count exceeds 100, a verification value with a signature is output. In other words, a value in the utilization-value holding unit 21 is read out and the digital signature unit 24 is caused to create the verification value with the signature, which is output (S64, S65). Then the verification value with the signature and a message "transfer to the halt mode" are returned to the information processing unit 11 (S66). Further, the count in the calculating unit 32 is cleared and the halt mode is restored (S67, S68).

When the control unit 30 is in the halt mode at Step S61, a decision is made as to whether the request received is the encrypting request, the verification-value output request or the function restart request (S69, S70, S71). When the request is the encrypting request, a message "the halt mode at present" is returned to the information processing unit 11, and the processing is terminated (S72). When the request is the verification-value, the verification value in the utilization-value holding unit 21 is read-out and the digital signature unit 24 is caused to create the verification value with the signature, which is output (S73, S74). Then the verification value with the signature is returned to the information processing unit 11, and the processing is terminated (S75). When the request is the function restart request, the function restart process at a node A is followed. When the request received is not the encrypting request, the verification-value output request nor the function restart request, an error is returned to the information processing unit 11, and the processing is terminated (S76).

Figure 15:
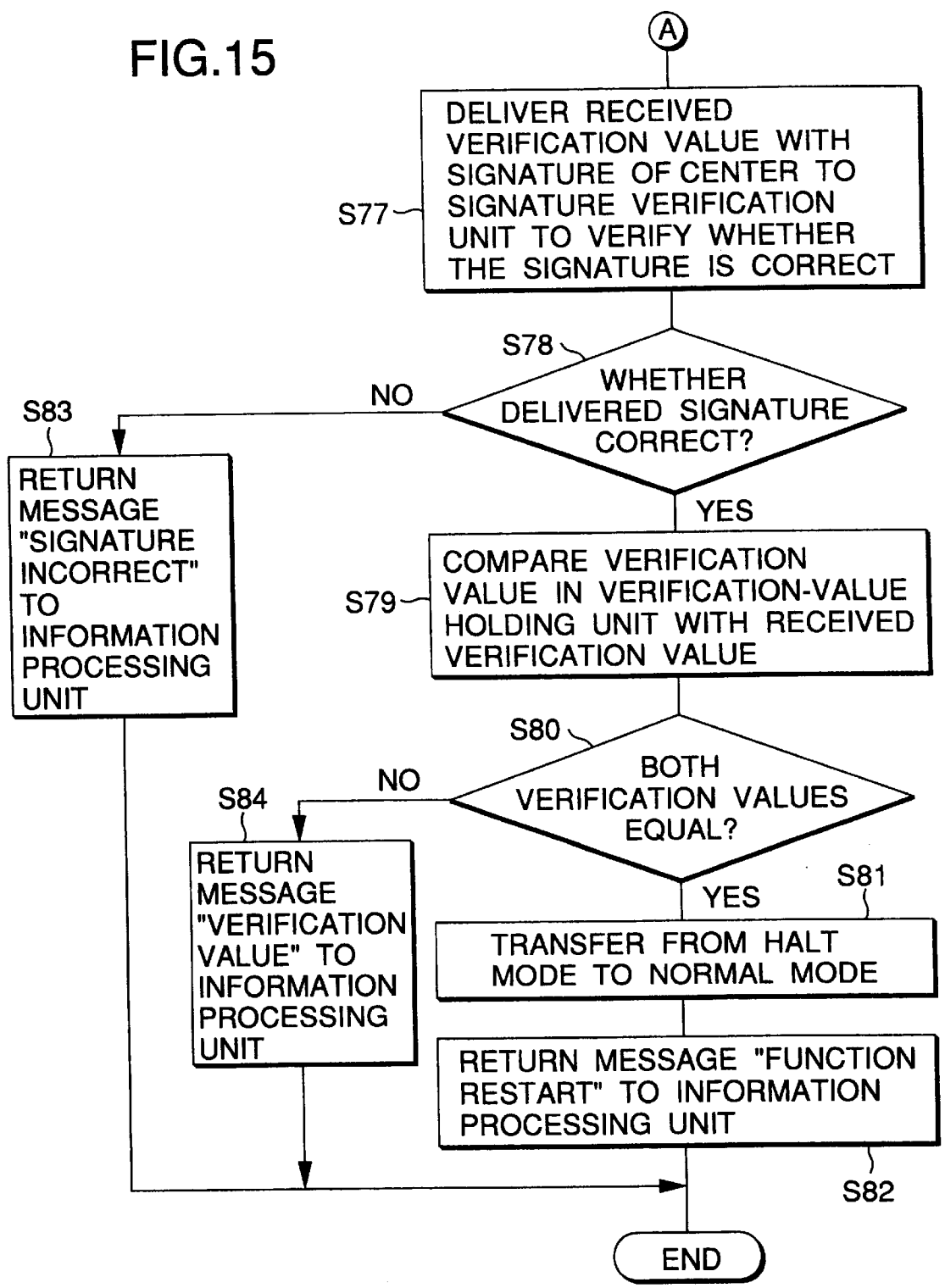
FIG. 15 is a flowchart explanatory of processing to be performed in the token 12 of FIG. 13.
Figure 16:
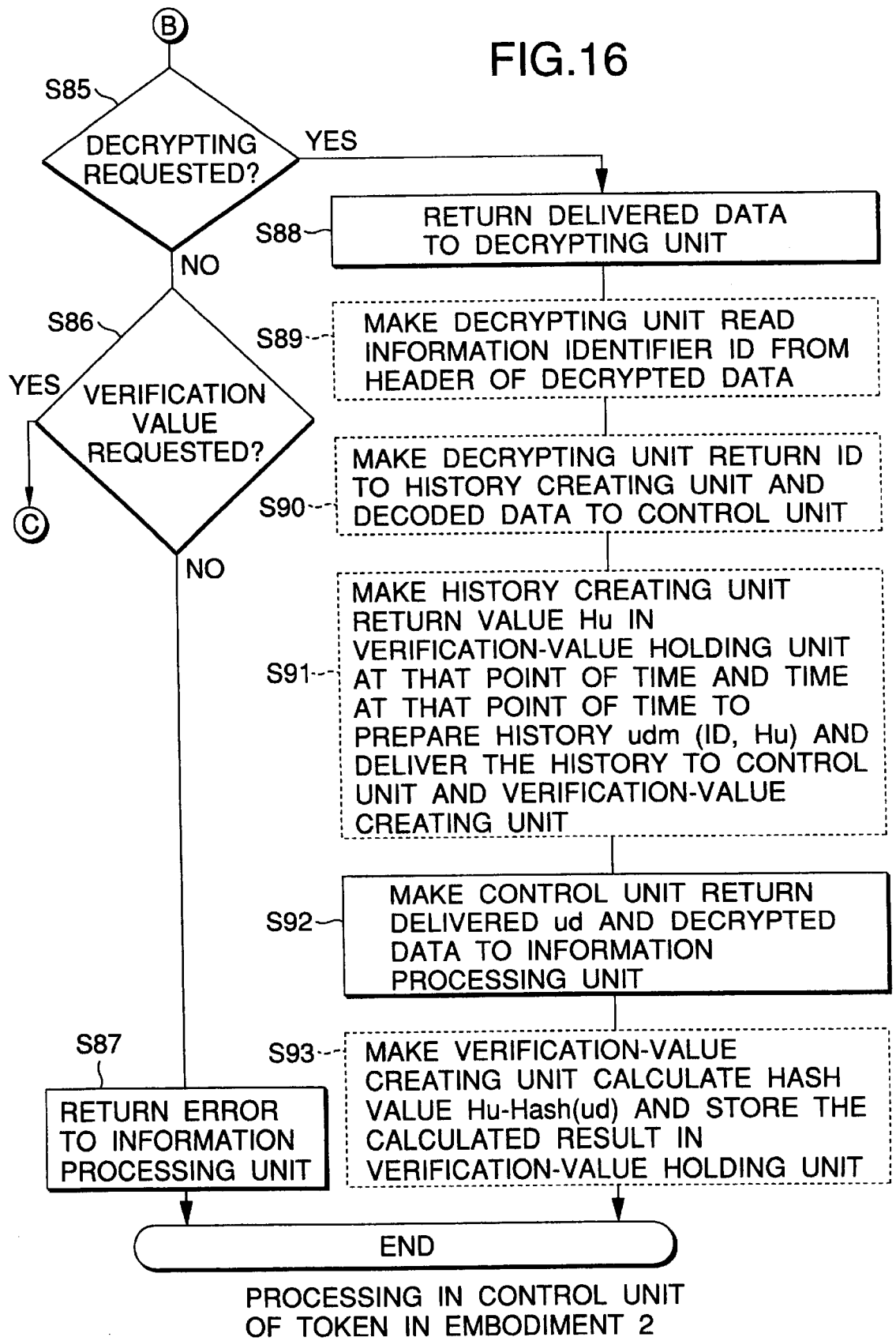
FIG. 16 is a flowchart explanatory of processing to be performed in the token 12 of FIG. 13.

FIG. 15 shows the function restart process. In FIG. 15, the received verification value with the signature is delivered to the digital signature unit 24 so as to verify the correctness of the signature (S77). If the signature is correct, the verification value thus delivered is compared with the verification value in the utilization-value holding unit 21 and examined whether both conform to each other (S78–S80). If both conform to each other, the mode of the control unit is transferred from the halt mode to the normal mode, and a message "function restart" is returned to the information processing unit 11 (S81, S82). If the signature is incorrect at Step S78, a message "incorrect signature" is returned to the information processing unit 11, and the processing is terminated (S83). When the verification value is inconsistent at Step S80, a message "inconsistent verification value" is returned to the information processing unit 11, and the processing is terminated (S84).

FIG. 16 refers to a case where the count does not exceed a threshold value, for example, 100. In FIG. 16, whether or not the request is the encrypting request is inspected (S85). When it is the encrypting request, the delivered data is sent to the decryptor unit 19 (S88). The decryptor unit 19 carries out the encrypting operation (S89–S93). When the request is not the encrypting request, a decision is made on whether it is the verification-value request (S86). When it is the verification value request, the flow proceeds to a node C of FIG. 14 where the verification-value output process is performed. When the request is not the verification-value output request at Step S86, an error is returned to the information processing unit 11, and the processing is terminated (S87).

The description of the processing in the control unit 30 of the token 12 is terminated for the moment.

Although it has been arranged to restore the halt mode even when the verification value request is made from the information processing unit 11 according to this embodiment of the invention (transferring from Step 86 of FIG. 16 to the node C of FIG. 14), this arrangement need not necessarily be made. With respect to the verification value request in the normal mode, for example, the verification value is updated and then a signature is provided for the verification value held at that point of time so that the then value may be returned (this merit will be described at the end of the description of this embodiment of the invention).

The decryptor unit 19 and the user private-key holding unit 18 have the same functions as those described in Embodiment 1 of the present invention.

The history creating unit 31 performs, as also shown in FIG. 16, the process of generating three sets of the information identifier delivered from the decryptor unit 19 and the present verification value and delivering them to the control unit 30 as the utilization history.

With respect to the history ud delivered from the history creating unit 31, the utilization-value creating unit 20 performs the process of calculating the following Hash value, (Numerical Formula 3)

$$Hu = \text{Hash}(ud)$$

and storing the calculated result in the utilization-value holding unit 21, which holds the verification value at that point of time.

As in Embodiment 1 of the present invention, the digital signature unit 24 uses the private key held in the token private key holding unit 23 holding the special private key for the token to provide the digital signature with respect to the value given. According to this embodiment of the invention, further, the signature verification unit 34 is provided so as to verify whether the signature delivered by the use of the public key of the center held in the center public-key holding unit 33 is the signature of the center. Digital signature technology such as RSA signature is basically usable for these constituent units; however, the detailed description thereof will be omitted as it is well known technology.

Figure 17:
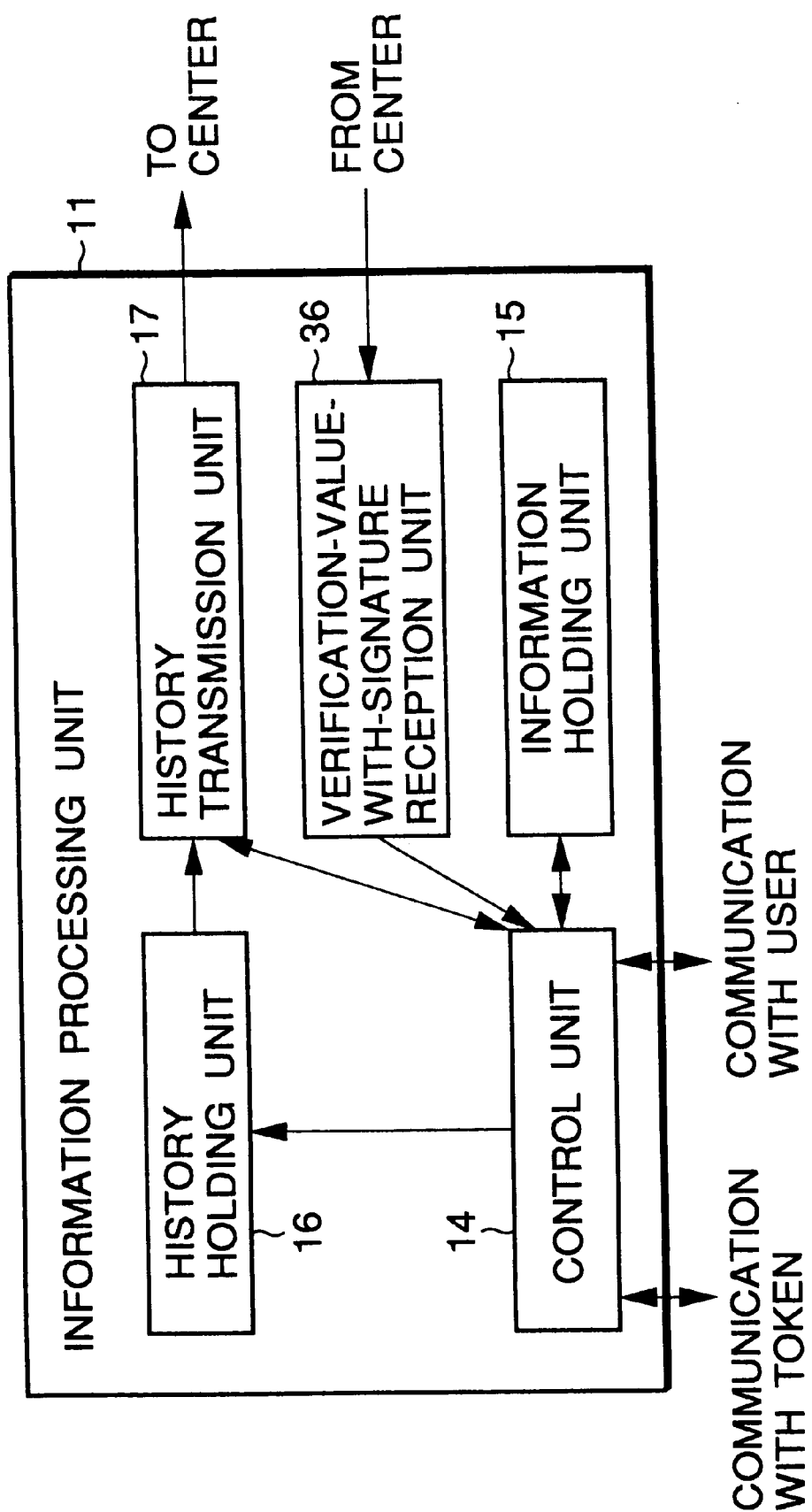
FIG. 17 is a block diagram showing the function block materialized in the information processing unit 11 in Embodiment 2.

FIG. 17 shows the construction of the information processing unit 11 according to this embodiment of the invention, wherein like reference characters designate like or corresponding parts of FIG. 2. As shown in FIG. 17, though the construction is substantially similar to what is shown in Embodiment 1 of the present invention, the token enters the halt mode at a certain point of time in the information processing unit 11 according to this embodiment of the invention and in order to make the function restart, a history has to be transmitted to the center to cause the center to send the restart message accordingly. Therefore, a verification value reception unit 36 for receiving a verification value with a signature from the center is slightly varied. Further, the history hold in the history holding unit 16 is also different in construction.

Figure 18:
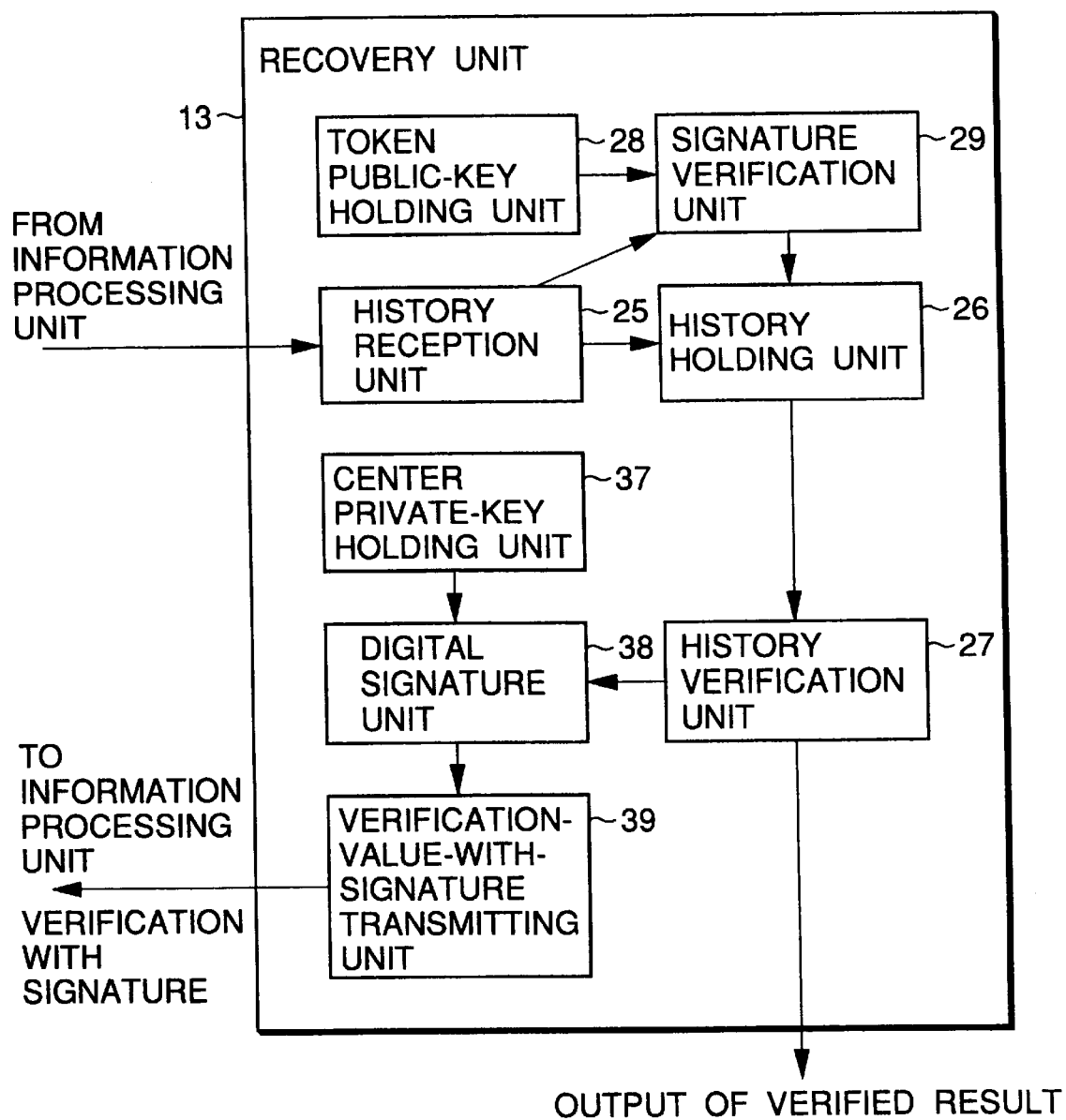
FIG. 18 is a block diagram showing the construction of the recovery unit 13 in Embodiment 2.

FIG. 18 shows the construction of the recovery unit 13 of the center according to this embodiment of the invention, wherein like reference characters designate like or corresponding parts of FIG. 5. In comparison with the constitution of Embodiment 1 of the present invention, since the verification value with the-signature has to be sent to the information processing unit 11 when the correctness of a history is verified, there are additionally installed constituent units for the purpose; namely, a center private-key holding unit 37, a digital signature unit 38 and a verification-value-with-signature transmitting unit 39. As the utilization history sent from the information processing unit 11 is different in construction, the history processed in the recovery center naturally differs.

FIGS. 19A to 19E show the construction of the utilization history held in each of the constituent units.

Figure 19A:
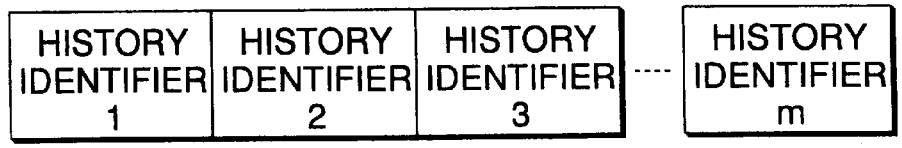
FIGS. 19A to 19E are diagrams showing the construction of the utilization history in Embodiment 2.

FIG. 19A refers to the utilization history recorded in the history holding unit 16 of the information processing unit 11. The contents of the individual history include two: a pair of information identifier shown in FIG. 19C and verification value held in the token at that point of time.

Figure 19B:
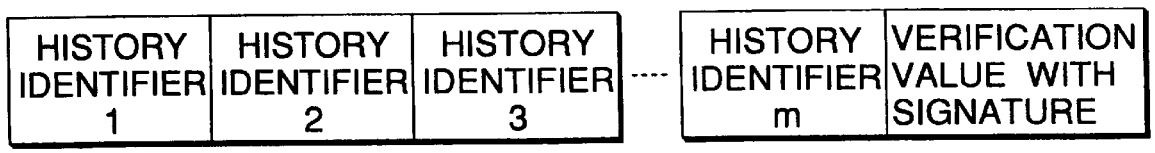
Figure 19C:
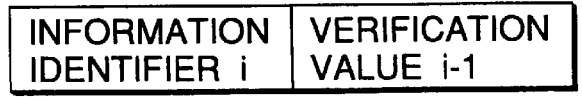

When the history is sent from the information processing unit 11 to the center, the verification value with the signature of the token is affixed to the last position of the line if the history shown in FIG. 19B. The verification value with the signature is output when the token 12 ceases to function and the token 12 provides the verification value with the signature at that point of time shown in FIG. 19D.

Figure 19D:
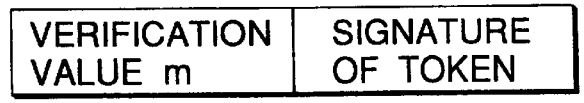
Figure 19E:
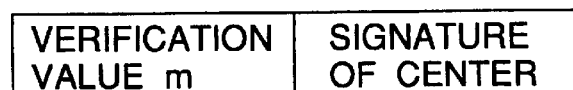

The center employs the verification value with the signature for verifying the history shown in FIG. 19D. When the correctness is proved as a result of verification, the center provides the verification value attached to the last position as a message for restarting the function of the token 12 with a signature and the value thus obtained is sent to the information processing unit 11. This is shown in FIG. 19E.

The processing performed by the recovery unit 13 will subsequently be described. When a history is transmitted from the information processing unit 11, it is received by the history reception unit 25. The history received is stored in the history holding unit 26 and also delivered to the signature verification unit 29. The signature verification unit 29 selects the public key of the token 12 connected to the information processing unit 11 which has transmitted the history from among the plurality of token public keys stored in the token public-key holding unit 28, and verifies the signature of the history using the public key. The verified result is held together with the, history stored in the history holding unit 26.

When the reception of the history is completed, the history verification unit 27 starts operating. The history verification unit 27 refers to not only the history received now but also the result of verifying the signature affixed thereto. If the result of verifying the signature is incorrect, processing thereafter is not performed. If the result of verifying the signature is correct, it is further verified whether the contents of the signature are correct.

The process of verifying the contents of the signature is performed as follows:

(1) It is assumed that the line of the history sent is as follows: (id1, hu0), (id2, hu1), (id3, hu2), ..., (idn, hun-1), sign (hun where id=information identifier, hu=verification value at a point of time the history is created, and sign ()=sign of the token.

(2) The verification value sent by the token previously is found out of the history holding unit and defined as HOLD.

(3) The verification value huo is taken out of the initial history (ID1, hu0) of the utilization history that has been sent to make it certain whether the verification value is equal to HOLD.

(4) Subsequently, (ID1, hu0) is calculated to make it certain whether the (IDI, hu0) conforms to hu1.

(5) This step is repeatedly taken up to the final verification value $hu_n$ likewise.

(6) On condition that the utilization history has passed every inspection, it is regarded as being correct.

Only when the history is judged correct through the verification process, the final verification value $hu_n$, is sent to the signature verification unit, so that a digital signature is provided by means of the public key of the center. Then the verification value with the signature of the center is sent back to the information processing unit from which the history has been transferred.

With the arrangement above, since the function of the token is stopped at a certain point of time, the user of the information processing unit has to send a correct history to the center in order to restart the function of the token. Therefore, the user can be urged to recover the history.

Since the final verification value is recorded on the center side, verification is proved to be simply unsuccessful even in a case where the correct history sent from the token is partially destroyed for some reason or other; consequently, no change is caused to the data held on the center side. Therefore, normal verification is carried out by making the token send the history again.

Even when part of the history is destroyed (or lost), almost all the rest may be made verifiable at the time the history is verified by causing the token to output the verification value autonomously.

More specifically, not only when the user demands a verification value as described above but also when the load of the token is low, the token is allowed to output autonomously the verification value with the signature it holds at that point of time, so that even when part of the history is destroyed (or lost), almost all the rest becomes verifiable at the time the history is verified.

In this case, the utilization history sent to the center is constructed as shown in FIG. 20, for example. At this time, it is assumed that a history 25 has been lost by accident on the information processing unit side.

In the case of a utilization history having the verification value shown above at only the last position, the verification of a history 26 and thereafter is possible. Notwithstanding the fact that the contents of from histories 1–24 have not been lost, their correctness remains unverifiable.

When the history 25 is lost, only a history 24 becomes unverifiable and the remaining histories are made verifiable by inserting verification values with signatures halfway throughout. More specifically, histories from 1 to 10 are made verifiable by a verification value 1 with a signature; histories from 11 to 23 by a verification value 2 with a signature; histories from 25 to 36 by a verification value 3 with a signature; and histories from 37 to 57 by a verification value 4 with a signature.

Thus, most of the remaining histories are made verifiable even when part of any history is lost by inserting verification values among the histories at suitable intervals.

In order to materialize the arrangement above, a decision unit for deciding whether the load is low is provided in the control unit within the token and when the load of the token is low, it is only needed to autonomously create the verification value with the signature.

Moreover, it may be arranged that the verification value with the signature is output by the information processing unit, that is, in compliance with a request from the user unless the token does the operation autonomously. Consequently, the processing may be altered from not causing the node C (Step S64) of FIG. 14 to branch off from the node C of FIG. 16 but creating a verification value with a signature by updating the verification value and returning the verification value to the information processing unit 11.

Further, time information as the utilization history is made retrievable by letting the token have the clock function, whereby the recovery center can be informed of not only the history about which information has been utilized but also the time when the information is used. The clock unit has an ordinary clock function and should only function as what outputs the present time in accordance with the request made by holding the date including years, months and days, and the time. In order to include the time in the history, it is only necessary to couple the time information to the information identifier. With the provision of the clock function, "the time passed after the preceding halt" can be set as the condition of restoring the above-described halt mode.

Although a history to be output outside is provided with the verification value held thereby at that point of time according to this embodiment of the invention, a count instead of the verification value may be output when the history is output outside by providing a counter unit in the token so that the count is counted each time the history is output. In this case, the portion as the hash function input described until now makes a utilization history and the count held at that point of time.

As set forth above, according to this invention, data is not stored in the protective apparatus to reduce the quantity of held data but output outside the protective apparatus, and a verification value having a small quantity of data is to be stored instead. Consequently, the storage capacity and the necessary processing capabilities of the protective apparatus can be suppressed. Since the verification value is sent outside together with a signature, dishonest alteration is preventable to ensure that data is verified. Moreover, even though data are dispersed for storage, the order of data is restored to facilitate data verification by adding order-restoring information to the data to make the order of such data restorable. Since the relevant processing made continuously performable when the protective apparatus receives a value resulting from providing the signature of an authorized person for the data held by the protective apparatus, the processing is made possible only by sending the data held in the protective apparatus to the authorized person and then sending back the data therefrom.

Therefore, verification data is sent to the authorized person at all times to ensure that the verification data is recovered. Even though part of the data is destroyed or the like, most of the remaining data can be verified for certain by outputting the verification value with the signature frequently.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data verifying method, comprising the steps of:
   creating a verification value of a data body inside a protective apparatus from a verification value of the relevant data body out of a plurality of data bodies generated in sequence and a verification value of a data body preceding the relevant data body;
   creating a verification value with a signature by adding a digital signature inside the protective apparatus to the verification value created for the last data body out of the plurality of data bodies to be verified at a time;
   sending the verification value with the signature outside from the protective apparatus; and
   verifying the plurality of data bodies based on the plurality of data bodies and the verification value with the signature.

2. An apparatus for creating data to be verified, said apparatus comprising:
   means for generating data bodies in sequence;
   verification value storage means for storing verification values;
   verification value creation means for creating a new verification value from the verification value stored in the verification value storage means and a newly generated data body and updating the verification value stored in the verification value storage means to the new verification value; and
   signature means for attaching a signature to the verification value stored in the verification value storage means at predetermined timing;
   wherein said verification value creation means, said verification value storage means and said signature means are installed in a protective apparatus.

3. A data verifying apparatus, comprising:
   a plurality of data bodies generated in sequence;
   means for receiving a verification value with a signature resulting from providing a signature for the verification value by adding a digital signature inside a protective apparatus to the verification value created for the last data body out of the plurality of data bodies to be verified at a time;
   signature verifying means for verifying the signature on the verification value received; and
   verifying means for verifying the correctness of the plurality of data bodies received from the verification value with the signature verified by the signature verifying means.

4. A history holding method for holding in a protective apparatus only a verification value resulting from sequential calculations with respect to a group of history data comprising:
   a plurality of continuous history data, and providing a signature for only the verification value when the verification value is output from the protective apparatus.

5. A history holding apparatus comprising:
   data input means for inputting a plurality of continuous data;
   data processing means for processing the data;
   verification value creation means for creating a verification value with history data in the form of a combination of the data processing and the verification value held at the time the history data is processed as inputs;
   verification value holding means for holding the verification value thus created; and
   signature means for providing a signature for the verification value;
   wherein said verification value creation means, said verification value holding means and said signature means are installed in a protective apparatus.

6. A history holding apparatus as claimed in claim 5, wherein unidirectional functions are used for calculations applicable to said verification value creation means.

7. A history holding apparatus as claimed in claim 5, wherein the history data is in the form of a combination of the history data body and the verification value at the time the history data is processed.

8. A history holding apparatus as claimed in claim 5, further comprising counter means for counting each time data is processed, wherein the history data in the history data group is in the form of a combination of the count when the data is processed and a history body.

9. A history holding apparatus as claimed in claim 5, wherein the verification value with the signature is output in compliance with a user's request.

10. A history holding apparatus as claimed in claim 5, wherein the history holding means comprising a single CPU with software; and
   wherein when the load of the CPU applied by the data processing means is low, the signature means creates and outputs the verification value with the proper signature.

11. A history holding apparatus as claimed in claim 5, further comprising function halt means for stopping the function of the data processing means at a point of time the verification value is output until a proper instruction is given from the outside.

12. A history holding apparatus as claimed in claim 11, further comprising halt condition holding means for stopping the function, wherein when the conditions described in the halt condition holding means are met, the function halt means outputs the verification value with the signature written thereto and stops its function.

13. A history holding apparatus as claimed in claim 11, further comprising public-key holding means for holding a public key of an external right person, wherein the function halt means verifies that an accepting instruction is intended to restore the function corresponding to the lastly-output verification value provided with a digital signature made by the external right person and that by verifying the signature with the public key held by the public-key holding means at the time of receiving the instruction, whether or not the verification value with the signature is equal to the verification value held by the verification value holding means.

14. A history verifying apparatus comprising:
data input means for inputting a verification value with a signature, the signature being provided for the verification value calculated from a plurality of continuous history data in group and from the data groups;
signature verifying means for verifying the signature of the verification value thus received with the signature; and
verifying means for verifying the correctness of the data group received from the data group received and the verification value whose signature has been verified.

15. A history verifying apparatus as claimed in claim 14, further comprising previous verification value storage means for storing the verification value received a last time;
wherein the verifying means employs the previous verification value when making verification.

16. A history verifying apparatus as claimed in claim 14, wherein the calculations for use in said verifying means are based on unidirectional functions.

17. A history verifying apparatus as claimed in claim 14, wherein the history data is in the form of a combination of the history data body and the verification value at the time the history data is processed.

18. A history verifying apparatus as claimed in claim 14, wherein the history data in the history data group is in the form of a combination of the value of the counter when the data is processed and a history body.

19. A history holding apparatus comprising:
data storage means for holding data;
halt condition holding means for holding the operating state of the data storage means at the time the function is stopped;
function halt means for stopping the function when the conditions held in the halt condition holding means are met and keeping the function stopped until a function start request is received from the outside;
private-key holding means for holding a private key;
digital signature means for providing a digital signature using the private key held in the private-key holding means for the data group held in data holding means;
digital signature holding means for holding the digital signature affixed; and
public-key holding means for holding the public key of an external right person, wherein the function halt means verifies that an accepting instruction is intended to restore the function corresponding to the digital signature provided by the external right person for the digital signature held in the digital signature holding means and that by verifying the signature with the public key held by the public-key holding means at the time of receiving the instruction, whether or not the value with the signature is equal to the value held by the digital signature holding means.

20. An electronic equipment comprising:
function halt means for stopping at least part of the function of an electronic equipment body when predetermined conditions are met;
means for outputting predetermined data;
means for receiving data with a signature, the data being created by providing the signature for the predetermined data;
signature verifying means for verifying the signature on the predetermined data received; and
means for releasing the halt state of that part of the function when the correctness of the signature of the data with the signature is verified by the signature verifying means.

21. A computer program product for effecting interaction between a data creation apparatus and a data recovery apparatus for recovering data bodies that are output from the data creation apparatus, which comprises means for generating the data bodies in sequence, verification value holding means for holding verification values, verification value creation means for creating a new verification value from the verification value held in the verification value holding means and a newly generated data body and updating the verification value held in the verification value holding means to the new verification value, and signature means for attaching a signature to the verification value held in the verification value holding means at predetermined timing, characterized by causing a computer to take the steps of:
storing the data body that is output from the data creation apparatus and the verification value provided with the signature, and
sending the data body and the verification value with the signature thus stored therein to the data recovery apparatus at predetermined timing.

* * * * *